(12) United States Patent
Bultan et al.

(10) Patent No.: US 10,656,268 B2
(45) Date of Patent: May 19, 2020

(54) ACOUSTIC SPATIAL DIAGNOSTICS FOR SMART HOME MANAGEMENT

(71) Applicant: Quantenna Communications, Inc., San Jose, CA (US)

(72) Inventors: Aykut Bultan, Santa Clara, CA (US); Narayanan Bharath, Mountain House, CA (US); Sam Heidari, Los Altos Hills, CA (US); Hossein Dehghan, Diablo, CA (US)

(73) Assignee: ON SEMICONDUCTOR CONNECTIVITY SOLUTIONS, INC., Phoenix, AZ (US)

( * ) Notice: Subject to any disclaimer, the term of this patent is extended or adjusted under 35 U.S.C. 154(b) by 0 days.

(21) Appl. No.: 16/429,731

(22) Filed: Jun. 3, 2019

(65) Prior Publication Data

US 2019/0285745 A1    Sep. 19, 2019

Related U.S. Application Data

(63) Continuation of application No. 15/810,129, filed on Nov. 12, 2017, now Pat. No. 10,310,082, which is a continuation-in-part of application No. 15/662,268, filed on Jul. 27, 2017, now Pat. No. 9,866,308.

(51) Int. Cl.

| *G01S 15/66* | (2006.01) |
| *G01S 15/04* | (2006.01) |
| *G01S 15/06* | (2006.01) |
| *G01S 5/22* | (2006.01) |
| *H04W 84/12* | (2009.01) |
| *G10L 15/06* | (2013.01) |
| *H04W 84/18* | (2009.01) |

(52) U.S. Cl.
CPC ............ *G01S 15/66* (2013.01); *G01S 5/22* (2013.01); *G01S 15/04* (2013.01); *G01S 15/06* (2013.01); *G10L 15/063* (2013.01); *H04W 84/12* (2013.01); *H04W 84/18* (2013.01)

(58) Field of Classification Search
CPC .......... G01S 15/66; G01S 15/06; G01S 15/04; H04W 84/12; H04W 84/18; G10L 15/063
See application file for complete search history.

(56) References Cited

U.S. PATENT DOCUMENTS

| 9,921,309 | B1* | 3/2018 | Skowronek | ........... G01S 17/023 |
| 2013/0343571 | A1* | 12/2013 | Rayala | .................. H04R 3/005 |
| | | | | 381/92 |
| 2015/0253424 | A1* | 9/2015 | Cheatham, III | ........ G01S 15/89 |
| | | | | 367/107 |
| 2016/0066117 | A1* | 3/2016 | Chen | ...................... H04R 3/005 |
| | | | | 381/26 |
| 2016/0133115 | A1* | 5/2016 | Neese | ................ G08B 13/1672 |
| | | | | 381/56 |

\* cited by examiner

*Primary Examiner* — Afshawn M Towfighi
(74) *Attorney, Agent, or Firm* — Maschoff Brennan

(57) ABSTRACT

An acoustic spatial diagnostic circuit couples to an array of microphones to successively sample an acoustic environment surrounding a wireless transceiver to generate an acoustic spatial map of activity within the environment based on sets of acoustic samples and execute one or more actions based on a related portion of the acoustic spatial map exhibiting one or more correlations with a spatial context condition of a wireless trained transceiver.

20 Claims, 9 Drawing Sheets

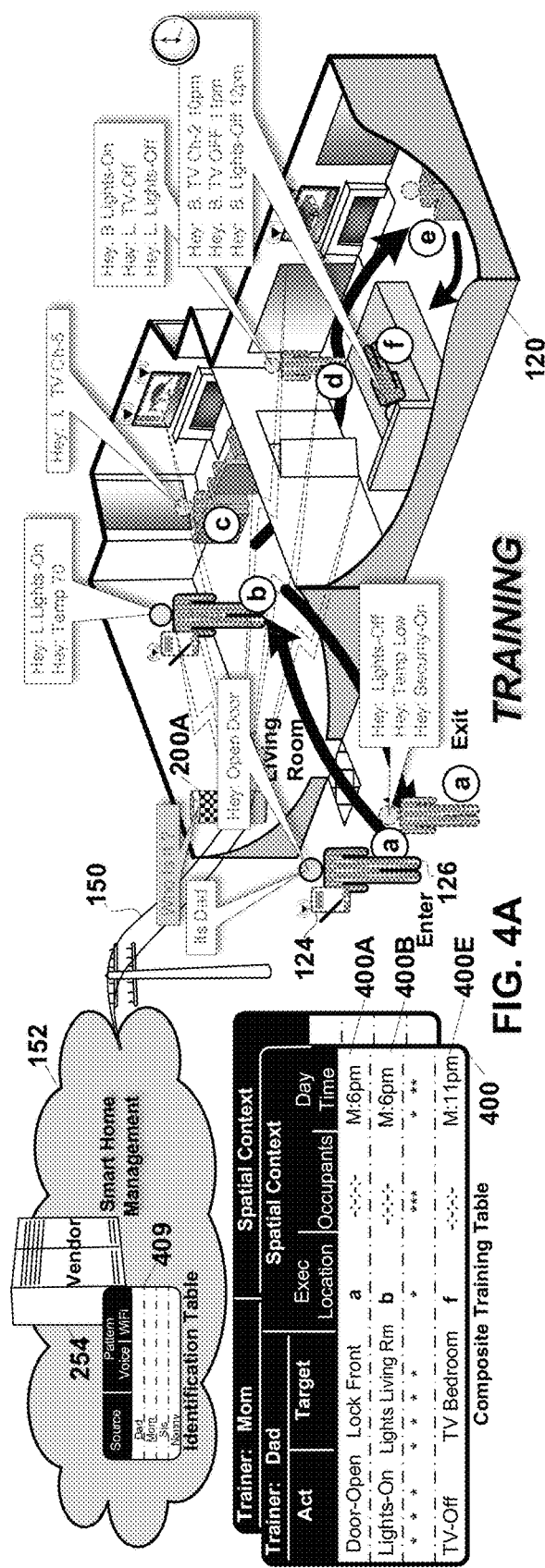
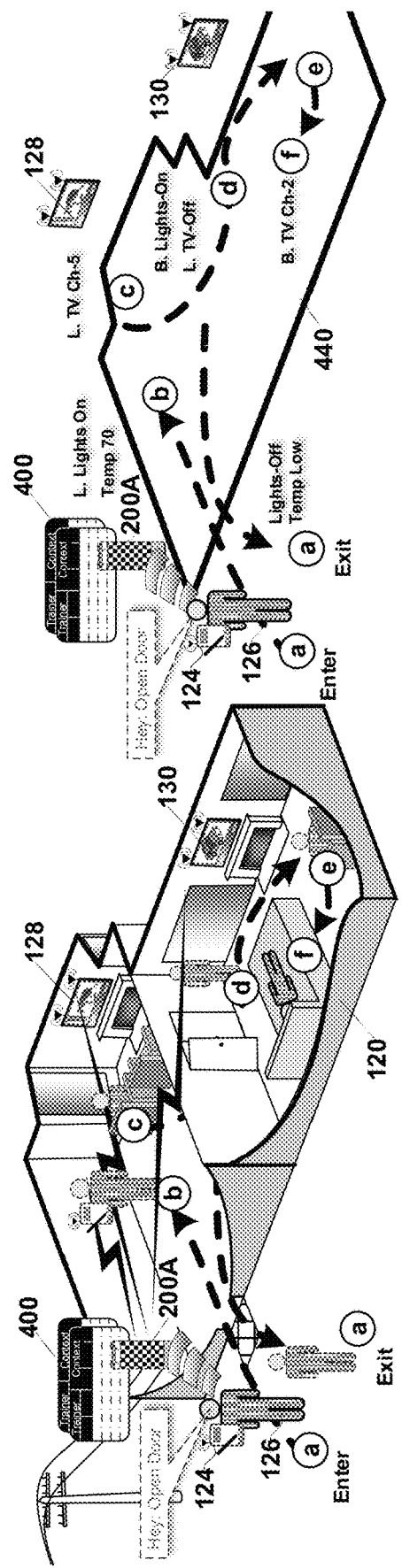
FIG. 4A — TRAINING
FIG. 4B / FIG. 4C — EXECUTION: via Passive WiFi & / Audio Context Detection

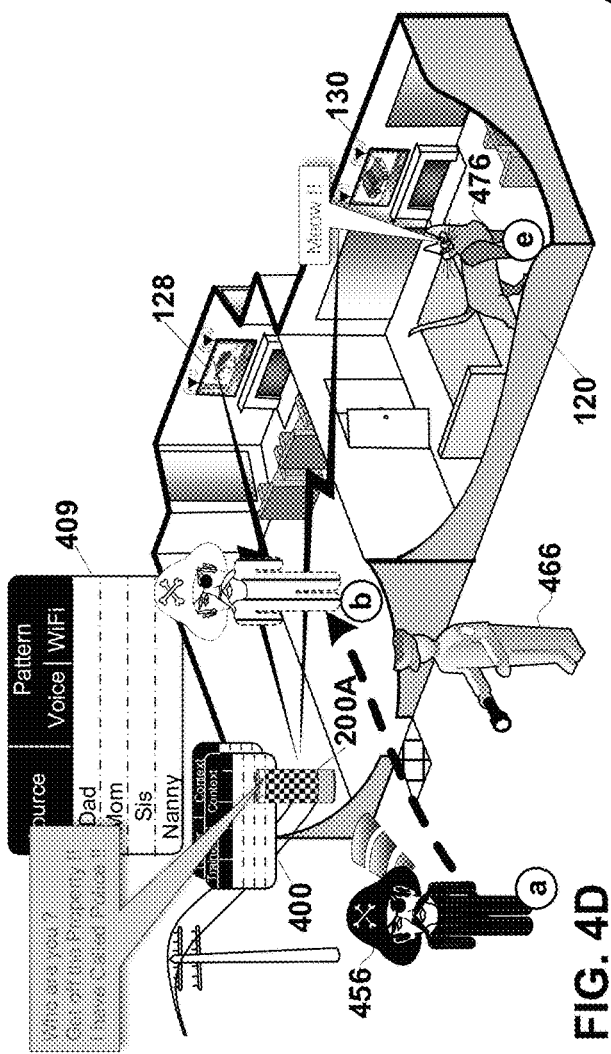
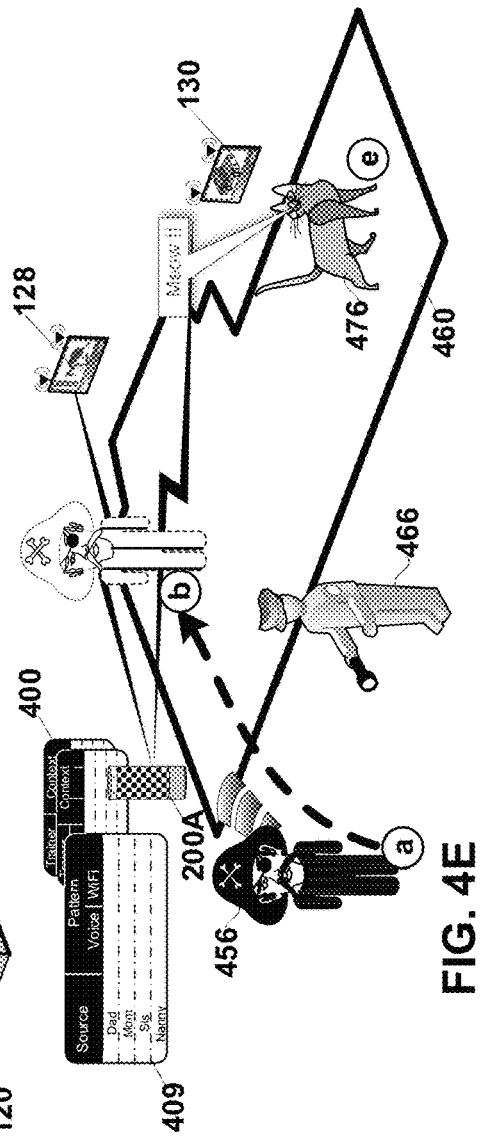
FIG. 4D
FIG. 4E
EXECUTION: via Passive WiFi & / Audio Context Detection

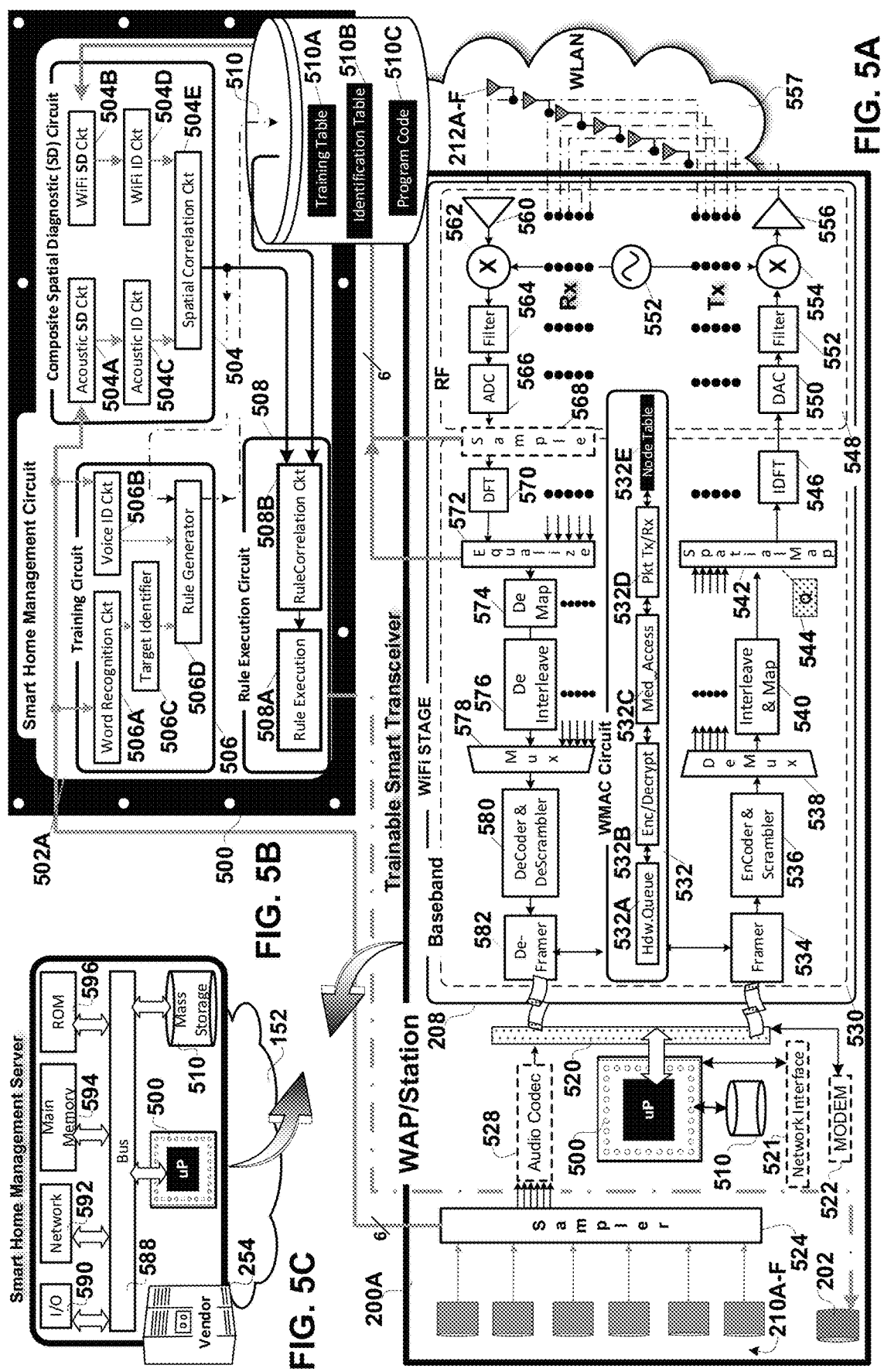

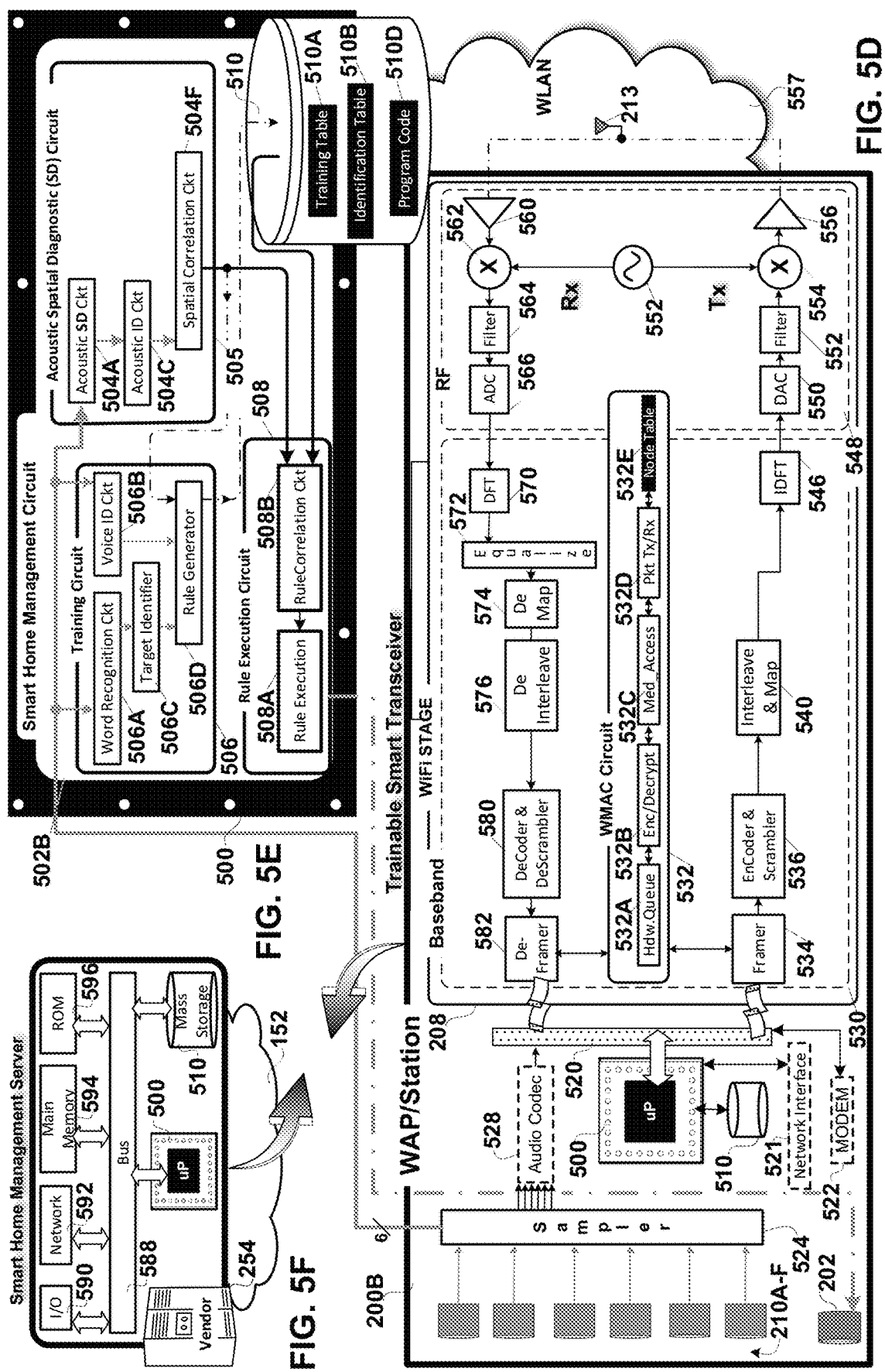

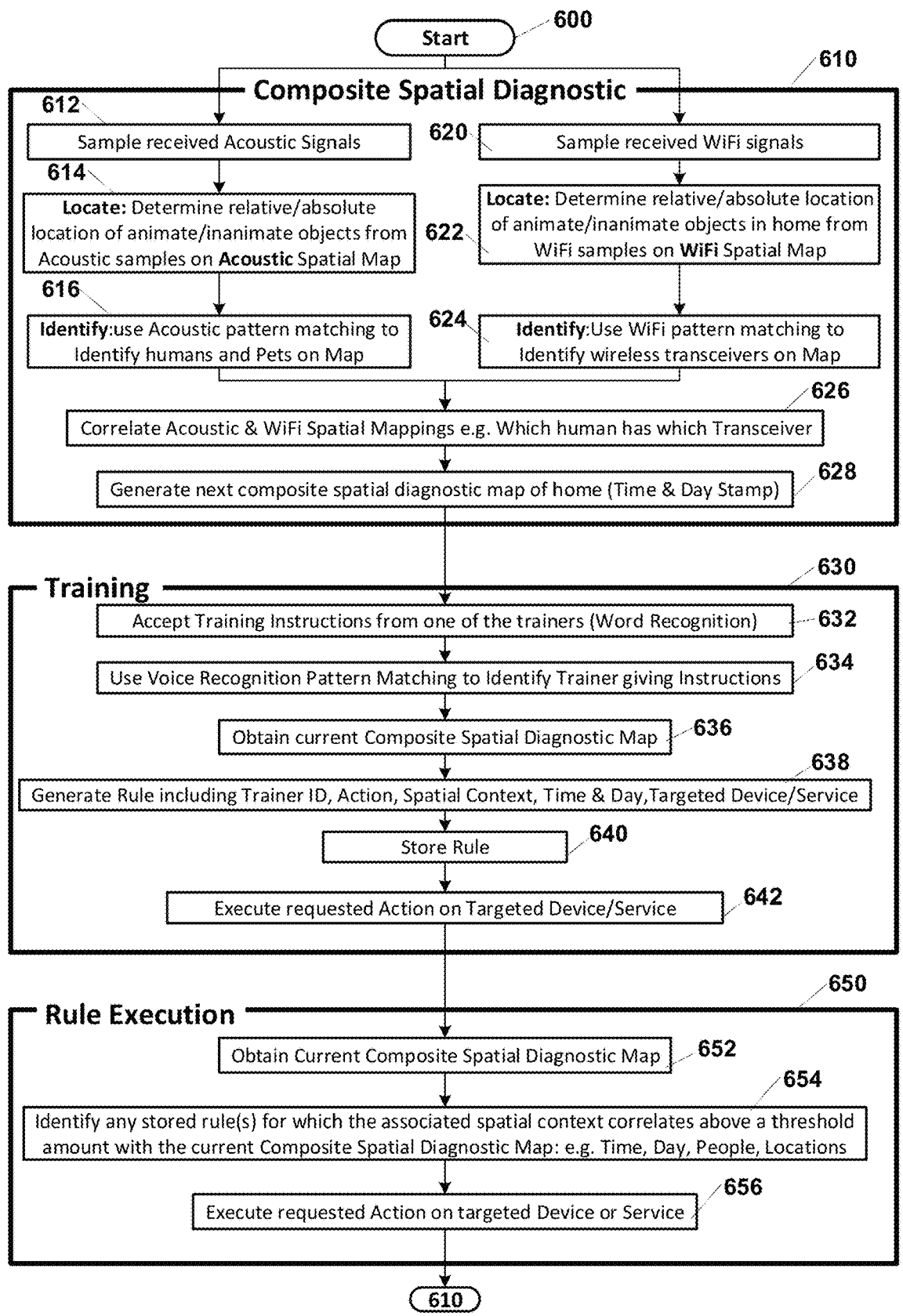
FIG. 6A Method for Composite Spatial Diagnostics for Smart Home Management

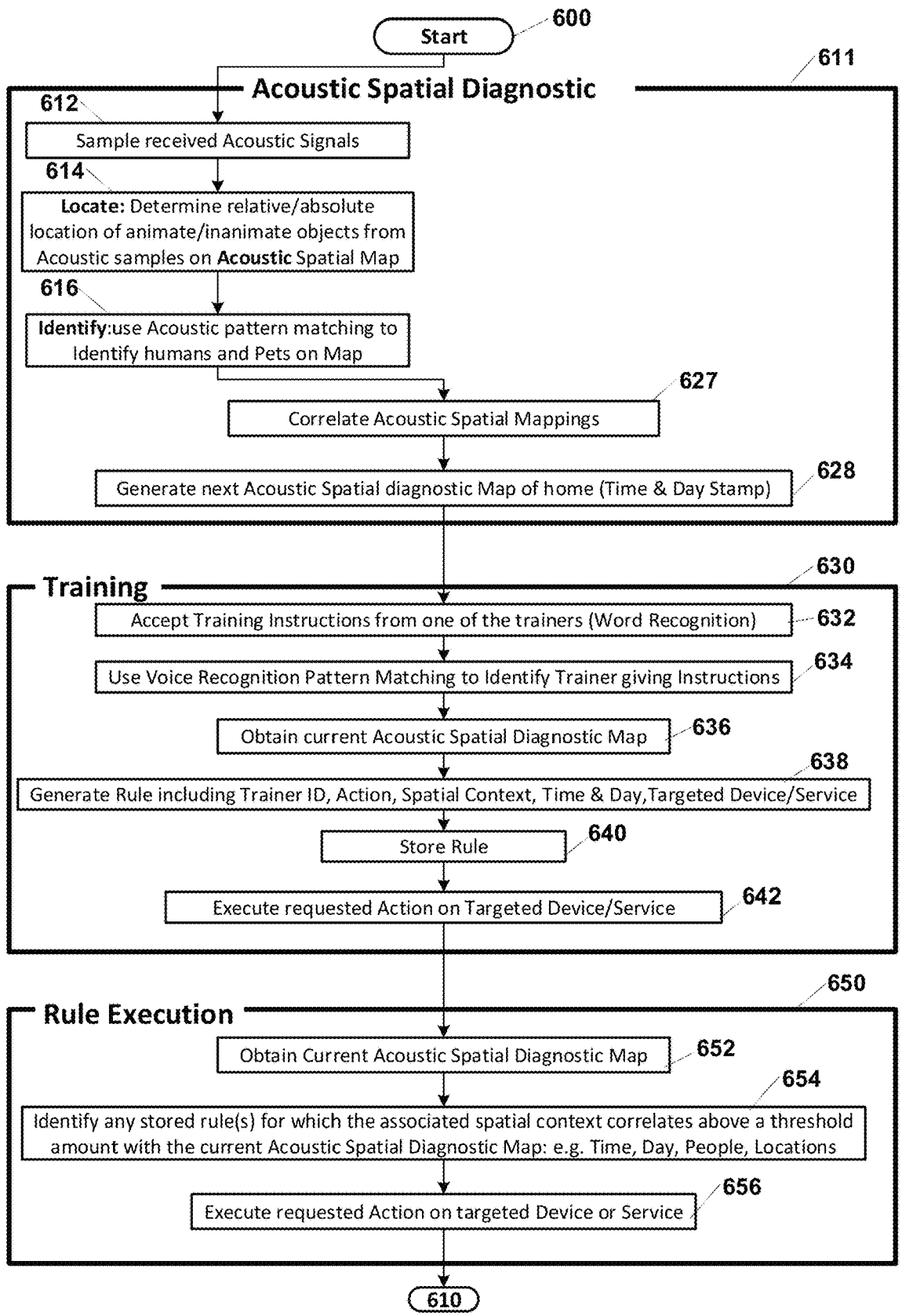
FIG. 6B Method for Acoustic Spatial Diagnostics for Smart Home Management

ACOUSTIC SPATIAL DIAGNOSTICS FOR SMART HOME MANAGEMENT

CROSS REFERENCE TO RELATED APPLICATION

This application is a continuation of and claims the benefit of prior filed co-pending U.S. patent application: Ser. No. 15/810,129 filed on Nov. 12, 2017 entitled "Acoustic Spatial Diagnostics for Smart Home Management" which is a continuation-in-part of U.S. Pat. No. 9,866,308 issued Jan. 9, 2018 filed on Jul. 27, 2017 as U.S. patent application: Ser. No. 15/662,268 entitled "Composite WiFi and Acoustic Spatial Diagnostics for Smart Home Management" which are incorporated herein by reference in its entirety as if fully set forth herein.

BACKGROUND OF THE INVENTION

1. Field of Invention

The field of the present invention relates in general to wireless local area networks including wireless access points (WAP) and stations and methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Carrier Sense Multiple Access (CSMA). CSMA is a distributed random access methodology for sharing a single communication medium, by having a contending communication link back off and retry access when a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with single antenna single stream or multiple-antenna multi-stream transceivers concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

Despite the increasing reliance on WAPs to service home and business communication requirements there has been little change in the functions provided by the WAP. What is needed are improved methods for operating wireless local area networks in homes and businesses.

SUMMARY OF THE INVENTION

The present invention provides a method and apparatus for a wireless access point (WAP) or station, individually or collectively with a remote server, to provide smart home management.

In an embodiment of the invention a wireless transceiver is configured for wireless communications on a wireless local area network (WLAN). The transceiver includes: at least one antenna; a plurality of transmit and receive path components; an array of microphones; an acoustic spatial diagnostic circuit and a rule execution circuit. The plurality of components couple to one another to form transmit and receive paths coupled to the at least one antenna for processing wireless communications. The acoustic spatial diagnostic circuit couples to the array of microphones to successively sample an acoustic environment surrounding the wireless transceiver and to determine from each set of acoustic samples an acoustic spatial map of at least humans within the surrounding environment. The rule execution circuit couples to the spatial diagnostic circuit to execute an action proscribed by a selected rule when a related portion of the acoustic spatial map sampled by the spatial diagnostic circuit exhibits a correlation above a threshold amount with a spatial context condition associated with the selected rule.

The invention may be implemented in hardware, firmware, circuits or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 4A-E are system diagrams of the training and execution of the composite spatial diagnostic features of the trainable smart transceiver in accordance with an embodiment of the invention;

FIGS. 5A-C and FIGS. 5D-F are hardware block diagrams of various devices configured to execute respectively composite spatial diagnostics and acoustic spatial diagnostics of the trainable smart transceiver in accordance with alternate embodiments of the invention; and FIGS. 6A-B are a process flow diagram of processes associated with operation of alternate embodiments of the trainable smart transceiver with respectively composite spatial diagnostic capability and acoustic spatial diagnostic capability, for smart home management.

DETAILED DESCRIPTION OF THE EMBODIMENTS

Figure 1:
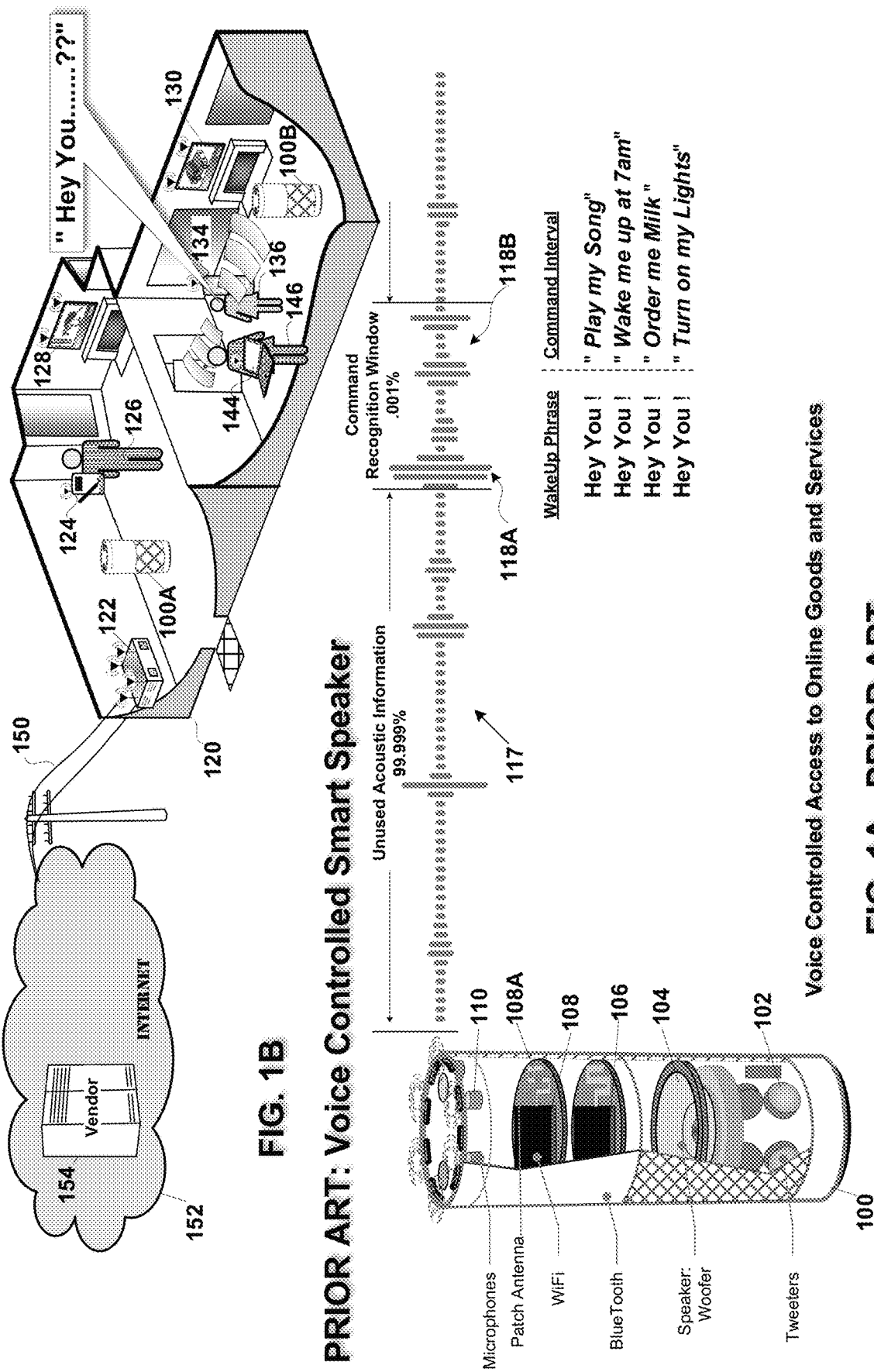
FIGS. 1A-B are detailed hardware and system views of respectively a prior art voice controlled smart speaker and a system incorporating the voice controlled smart speaker.

FIGS. 1A-B are detailed hardware and system views of respectively a prior art voice controlled smart speaker and a system incorporating the voice controlled smart speaker. Corporations such as Amazon, Google, and Apple each make voice controlled smart speakers. These devices are each provide voice controlled access to online goods and services including: music streaming, and grocery delivery for example. These devices also provide voice control of compatible $3^{rd}$ party devices installed in the home or business, such as: smart plugs, smart outlets and cameras.

FIG. 1A shows a representative voice controlled smart speaker 100 and an audio input 112 processed by the speaker. The voice controlled smart speaker includes: tweeters 102, a woofer 104, a Bluetooth wireless stage 106 for communicating with Bluetooth compatible devices, a WiFi stage 108 and patch antenna 108A for WiFi connection to the Internet, and an array of microphones 110. The array of microphones enables voice control of the smart speakers with recognition of the spoken commands enhanced via adaptive beamforming and echo cancellation to cancel out sounds coming from other audio sources other than the voice of the user of interest. The user of interest being the one who in the stream of unused acoustic information 117 verbalizes a fixed wakeup/wakeword/command phrase 118A, e.g. "Hey You" which when recognized causes the voice controlled smart speaker's microphone array to focus on sound coming from that user and export to the cloud for audio processing the subsequent user command 118B, such as: "Play my Song", "Wake me up at 7 am", "Order me milk", "Turn on my Lights", etc. All other audio information outside of the narrow command recognition window encompassing the wakeword/wakeup phrase 118A and command 118B, is not used.

FIG. 1B shows the voice controlled smart speakers 100A-B operative as WiFi stations on a Wireless Local Area Network (WLAN) provided by Wireless Access Point (WAP) 122 in home 120. The WAP connects via a public switched telephone network 150 to the Internet 152 and specifically to the vendor 154 of the voice controlled smart speakers. The voice controlled smart speakers use this Internet connection to upload collected audio to the associated device vendor's voice recognition server/cloud 154. This server also includes connections to the vendor's order entry systems for delivery of services such as music streaming and grocery delivery. The home WLAN includes additional wireless stations such as: wireless TVs 128, 130, cell phones 124, 134, and wireless notebook computer 144. The family members who occupy the home and use these wireless devices: e.g. Dad 126, Mom 146, and Sis 136 are shown. In the example shown Sis has verbalized the wakeword/wakeup/command phrase "Hey You" and any subsequent command verbalized by her are sent by the receiving voice controlled smart speaker, e.g. speaker 100A via its WLAN connection to the Vendor's audio processing server(s)/cloud 154 for further processing.

Figure 2:
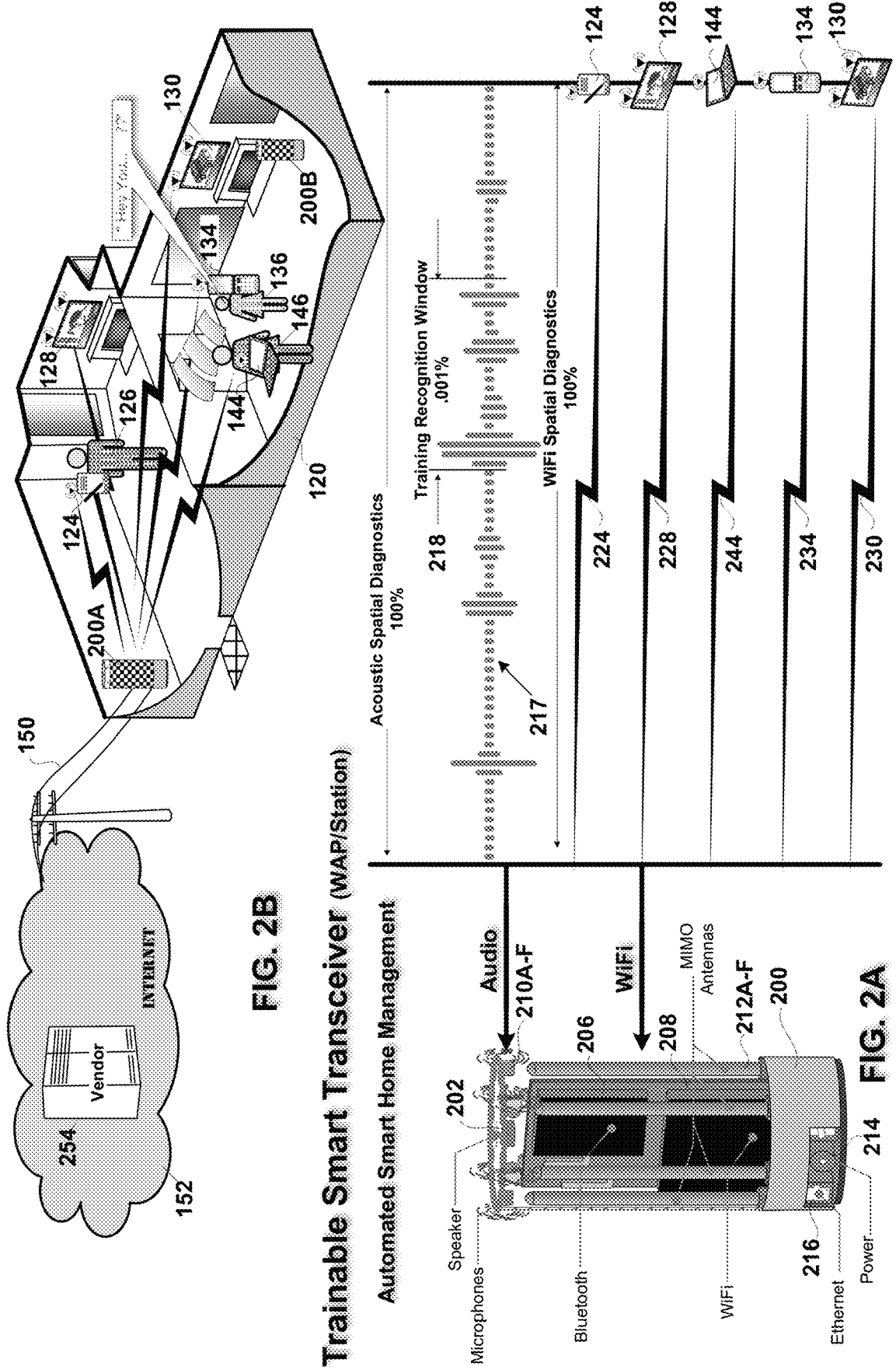
FIGS. 2A-B are detailed hardware and system views of respectively a trainable smart transceiver operative as a wireless access point (WAP) transceiver or station transceiver with composite spatial diagnostic capability and a system incorporating said trainable smart transceiver in accordance with an embodiment of the invention.

FIGS. 2A-B are detailed hardware and system views of respectively a trainable smart transceiver operative as a wireless access point (WAP) transceiver or station transceiver with composite spatial diagnostic capability and a system incorporating said trainable smart transceiver in accordance with an embodiment of the invention.

FIG. 2A shows a representative trainable smart transceiver 200 operative as a WAP and an audio input 217 processed by the smart transceiver. The trainable smart transceiver includes: a speaker 202, a Bluetooth wireless stage 206 for communicating with Bluetooth compatible devices, a WiFi stage 208 and an array of multiple-input multiple-output (MIMO) antenna 212A-F for WiFi connection to the Internet, an array of microphones 210A-F, and power 214 and Ethernet 216 connections. The array of microphones enables voice training of the smart transceiver with recognition of the spoken instructions 218 enhanced via adaptive beamforming and echo cancellation to cancel out sounds coming from other audio sources other than the voice of the user of interest. None of the acoustic information received by the speakers is wasted. All acoustic information 217 received by the array of microphones is continuously successively sampled to determine the acoustic environment surrounding the smart transceiver. The ongoing WLAN communications, are also continuously sampled to determine the WiFi environment surrounding the smart transceiver. The smart transceiver 200 operative as a WAP maintains communication links 224, 228, 244, 234, 230 with stations 124, 128, 144, 134 and 130 respectively. Each communication link is continuously successively sampled to determine the WiFi environment surrounding the wireless transceiver. From this continuous sampling of the WiFi and Acoustic environment a composite spatial map of humans and wireless transceivers within the surrounding environment is generated.

This added capability has several benefits the foremost of which is that daily repetition of commands, e.g. 'Hey You' "Turn on the Lights in the Living Room", can be reduced to a single training instance, after which the smart transceiver, will automatically turn on the lights when the current spatial context, matches the spatial context experienced during training. Ancillary benefits include: an increase in the accuracy of adaptive beamforming and echo cancellation resulting from cross correlating the location determinations based on acoustic samples and WiFi samples; as well as cross calibration of the location determination processes themselves.

FIG. 2B shows two trainable smart transceivers 200A and 200B operative as respectively a WiFi WAP and a WiFi station on a Wireless Local Area Network (WLAN) in home 120. The trainable smart WAP connects via a public switched telephone network 150 to the Internet 152 and specifically to the vendor of the voice controlled smart speakers. The voice controlled smart speakers use this Internet connection to upload collected audio to the associated device vendor's voice recognition server/cloud 154. This server also includes connections to the vendor's order entry systems for delivery of services such as music streaming and grocery delivery. The home WLAN includes additional wireless stations such as: wireless TVs 128, 130, cell phones 124, 134, and wireless notebook computer 144. The family members who occupy the home and use these wireless devices: e.g. Dad 126, Mom 146, and Sis 136 are shown. In the example shown Sis has verbalized the training phrase "Hey You" and any subsequent training instructions verbalized by her are sent by the receiving trainable smart WAP or smart station 200A-B via its WLAN connection to the Vendor's audio processing server(s)/cloud 254 for further processing.

Figure 3:
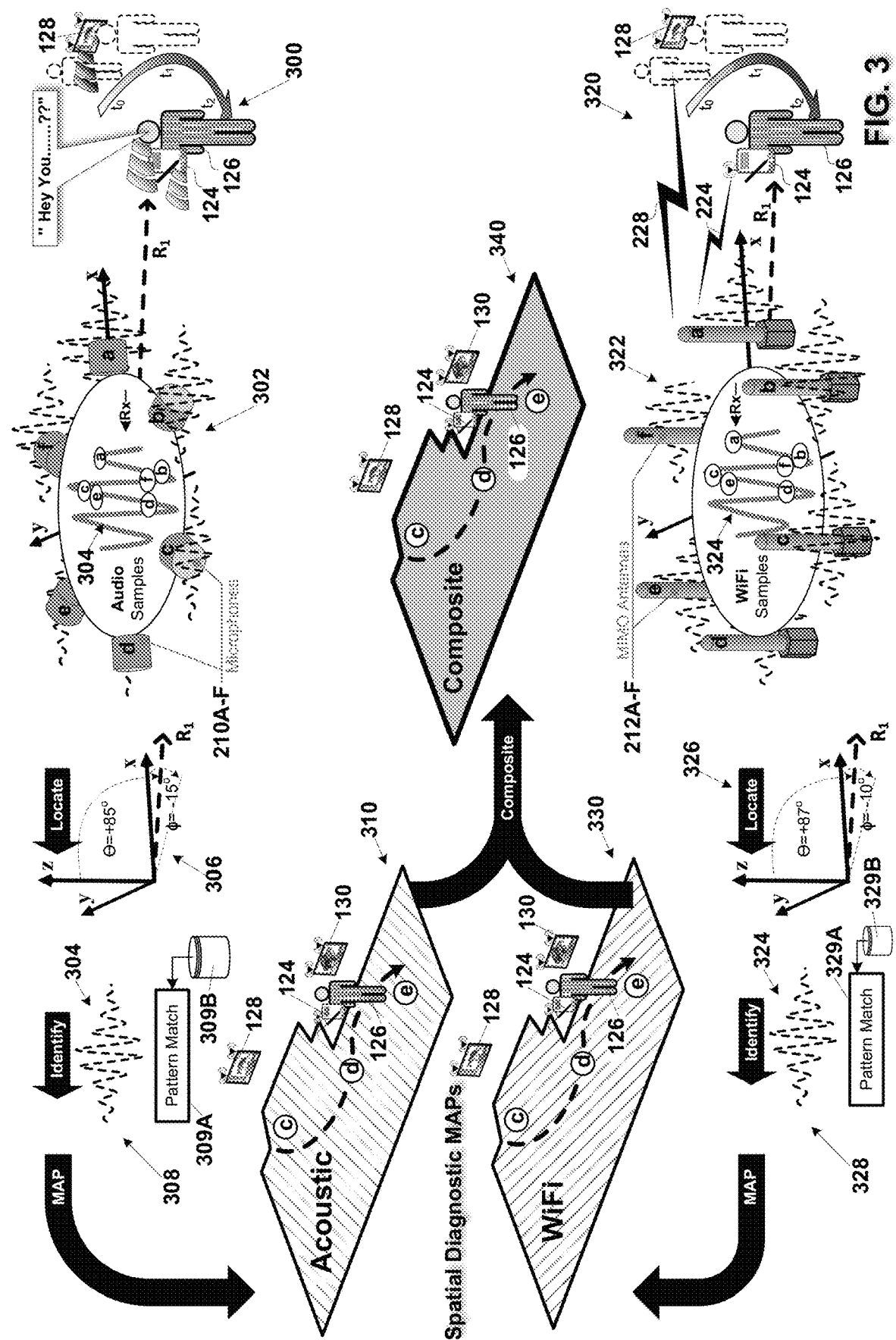
FIG. 3 is workflow diagram of the workflow associated with collection and composite processing of acoustic and WiFi samples by the trainable smart transceiver in accordance with an embodiment of the invention.

FIG. 3 is workflow diagram of the workflow associated with collection and composite processing of acoustic and WiFi samples by the trainable smart transceiver in accordance with an embodiment of the invention. The acoustic spatial diagnostic workflow is shown from right to left on the top of FIG. 3. The WiFi spatial diagnostic workflow is shown from right to left on the bottom of FIG. 3. The acoustic and WiFi workflows are combined to create composite spatial maps of the environment surrounding the trainable smart transceiver in the center of FIG. 3.

Acoustic Signal Sources: The home or structure surrounding the trainable smart transceiver includes animate and inanimate acoustic sources, some of which may be mobile. Animate acoustic sources include humans and animals. Inanimate acoustic sources include TVs, radios, refrigerators, air conditioners, washing machines. Even cell phones and computers have sizeable acoustic signatures during video playback or keyboard data entry for example. A portion of the acoustic environment 300 is shown to include TV 128, cell phone 124 and user 126, e.g. "Dad". Any conversation Dad has on the Cell phone, or any training instructions he provides to the smart transceiver of course produces a significant acoustic signal. Additionally, as Dad moves throughout the home his movement produces a path of detectable acoustic signals, e.g. his footsteps, the opening and closing of doors, cabinets, moving a chair to sit down, or placing his cell phone on a table or counter, etc. In process 302 the array of microphones 210A-F is used to continuously sample the acoustic environment. An acoustic sample of a signal 304 arriving from a direction proximate to microphone 210A is shown. That signal arrives at each of the remaining microphones 210B, 210F; 210C, 210E; and 210D at successively later points in time. In process 306 the differences in any one or more of: amplitude of arrival, time of arrival, angle of arrival or phase of arrival are used to determine the azimuth and elevation of each acoustic signal source relative to the trainable smart transceiver's microphone array as well as the distance of each sound source from the array. A host of more complex multi-source location determination algorithms such as "MUSIC" (Multi Signal Classification") or Pseudo-Doppler direction finding can also be used for location determination. Next in process 308 each sound source's corresponding acoustic signal, e.g. signal 304, is pattern matched 309A against a stored library 309B of known patterns. The known patterns may be part of a generic library of sound profiles or a custom library provided by the user and each family member at time of setup of the smart transceiver. Next, an acoustic map 310 of the surrounding acoustic environment is generated. The acoustic map includes each sound sources location and identity and the time of day and day of week at which the samples were obtained. A succession in time of acoustic maps can be used to indicate the path of mobile sound sources, e.g. user "Dad" 126 and his cell phone 124.

WiFi Signal Sources: The home or structure surrounding the trainable smart transceiver includes a number mobile and stationary WiFi signal sources, such as: cell phones; TVs; notebook, desktop and tablet computers; wireless appliances, wireless sensors, wireless cameras, wireless locks, wireless thermostats, etc. A portion of the WiFi environment 320 is shown to include the WiFi link 228 to wireless TV 128, and WiFi link to cell phone 224. The WiFi link is active even when there is no audio. Additionally, as Dad 126 moves throughout the home his cell phone's WiFi link 224 underdoes detectable changes as he moves. In process 322 the communication links received by the multiple-input multiple output (MIMO) array of WiFi antennas 212A-F are used to continuously sample the WiFi environment. A WiFi sample of a signal 304 arriving from a direction proximate to antenna 212A is shown. That signal arrives at each of the remaining antennas 212B, 212F; 212C, 212E; and 212D at successively later points in time. In process 326 the differences in any one or more of: amplitude of arrival, e.g. received signal strength indicia (RSSI); time of arrival; angle of arrival; or phase of arrival are used to determine the azimuth and elevation angles of each WiFi signal source relative to the trainable smart transceiver's antenna array as well as the distance of each WiFi source from the array. Related beamforming and channel matrices may also be used for these location determinations. Next in process 328 each WiFi source's is identified based on capabilities determined during a capabilities exchange or more subtly by pattern matching 329A a corresponding WiFi signal, e.g. signal 324, against a stored library 329B of known patterns. The known patterns may be part of a generic library of sound profiles or a custom library provided by the user and each family member at time of setup of the smart transceiver. Next, a WiFi map 310 of the surrounding WiFi environment is generated. The WiFi map includes each WiFi source's location and identity at the time of day and day of week at which the samples were obtained. A succession in time of WiFi maps can be used to indicate the path of mobile WiFi sources, e.g. cell phone 124, and its user "Dad" 126.

WiFi and Acoustic Signal Source Interferers: In an embodiment of the invention the animate objects, e.g. humans and animals, that may not themselves be the source of any WiFi or Acoustic signal can nevertheless be located based by tracking their temporary interference with the acoustic or WiFi links between stationary acoustic and WiFi signal sources and the smart transceiver 200A as they move across the path of these links. This movement perturbs the corresponding links, and that perturbation over time coupled with the known direction to or location of each of the acoustic and WiFi signal sources allows the location of any 'silent' humans and pets in the home on the composite spatial map 340.

Finally, a composite spatial map 340 with a timestamp as to day and time, is generated which includes the location and identify of each animate and inanimate object in the surrounding structure, which has either or both an acoustic or a WiFi signature. TV's 128 and 130 are identified by location and type. Dad 126 and his mobile phone 124 are identified. The succession in time of composite spatial maps can be used to more accurately indicate the path of mobile WiFi sources, e.g. cell phone 124, and its user "Dad" 126, than can either the audio or the WiFi spatial maps individually.

FIGS. 4A-C are system diagrams of the training and execution of the composite spatial diagnostic features of the trainable smart transceiver in accordance with an embodiment of the invention. FIG. 4A shows the training of the Smart transceiver while FIGS. 4B-C and FIGS. 4D-E show the automatic execution of the trained behavior in a spatial context in which the house is occupied, and unoccupied respectively.

FIG. 4A shows examples of one of the family members, e.g. "Dad" 126 training the smart transceiver 200A in home 120. Typically for security purposes, Dad and other family members will each have registered their individual voice prints/patterns with the smart transceiver via an administrative Interface or push button audio prompt and user response sequence (not shown) on the smart transceiver during the setup and activation of the smart transceiver. Different privileges may be assigned to each prospective trainer at this time as well. These acoustic patterns are added as identification records to the existing identification/authentication table 409 which may reside in the vendor's smart home management server 254 or on the smart transceiver 200A itself. Training can be conducted by any one or more of the family members or trusted parties. Training involves the verbalization of an instruction by a recognized authorized trainer and the recordation and storage of a corresponding rule in the composite training table for the associated trainer. Mom's and Dad's composite training tables are shown. Dad's composite training table 400 has each row comprising a rule, e.g. rules 400A-E. Each rule comprises: an act to perform; a target, if any, for the act; and the composite spatial context encountered in the surrounding environment at the time the training instructions were given. The composite spatial context in an embodiment of the invention includes: the location and identification of the animate and inanimate objects in the surrounding environment along with a timestamp, e.g. the day of the week and time, at which the rule instructions were given. Animate objects include humans and pets. Inanimate objects include: wireless stations such as: wireless TVs, computers, phones, locks, cameras and appliances; as well as devices that lack wireless capability but have which have acoustic signatures such as: vacuum cleaners, toasters, water faucets, toilets, windows, doors, washing machines and dryers, etc. The location and identification of objects is accomplished from a composite of the acoustic or WiFi spatial maps successively generated by the smart transceiver(s) 200A/B.

TRAINING: a) Dad@Front Door Entry In the example of FIG. 4A, as Dad 126 approaches the front door of the home, a.k.a. location "a", he issues a training instruction: "Hey: Open the Door". The smart transceiver 200A takes a snapshot of the surrounding spatial environment, in the form of a composite spatial map, both acoustic and WiFi of the entire structure inside and out. The composite spatial map includes the location, path/trajectory and identify of any occupants, human or animal in the house, and the location and identity of any objects in the house that have either or both a WiFi or acoustic signature. The smart transceiver 200A responds with a challenge phrase, e.g. "Who is it? Dad responds verbally, e.g. "Its Dad". The acoustic signal corresponding to Dad's request and response is received by the microphone array and matched against the corresponding acoustic identification record in the identification table 409. If Dad has his cell phone 124 with him, that WiFi transceiver is also used as part of the authentication/identification process. In the event of a match, a new rule record 400A is generated and entered into Dad's composite training table 400. The rule includes: the composite spatial map, the targeted device, e.g. a wireless smart lock on the front door, and the action to perform on the targeted device, e.g. open the lock. In this case the composite spatial map includes indicia of the path of the trainer, e.g. entering the home. Next, the rule is executed by the smart transceiver 200A opening the front door, via either a wired or wireless connection to a wireless smart lock on the front door, or via an indirect connection via the smart lock's cloud intermediary.

TRAINING: b) Dad@Living Room Entry: As Dad enters the living room, a.k.a. location "b", he issues two training instructions: "Hey: Turn the Living room lights On" and "Hey: Set the Temperature to 70 degrees'". The smart transceiver 200A takes a snapshot of the surrounding spatial environment, in the form of a composite spatial map, both acoustic and WiFi of the entire structure inside and out. The smart transceiver 200A compares the acoustic signal corresponding to Dad's instructions as received by the microphone array and matches it against the corresponding acoustic identification record in the identification table 409. If there is a match, and further in an embodiment of the invention, if Dad has the requisite privileges, e.g. to control home temperature, new rule records 400B$_{1-2}$ are generated and entered into Dad's composite training table 400. The rules include: the composite spatial map, the targeted device (s), e.g. a wireless smart switch for the living room and the smart thermostat for the house, and the actions to perform on the targeted device(s), e.g. living room smart light switch on, house thermostat temperature set to 70 degrees. Next, the rules are executed by the smart transceiver 200A turning on the living room lights and setting the household temperature to 70 degrees, via either a wired or wireless connection to a wireless smart switch and smart thermostat, or via an indirect connection via the manufacturers' or vendors' cloud intermediary.

TRAINING: c) Dad@Living Room Chair: As Dad settles into his favorite living room chair, a.k.a. location "c", he issues the training instruction: "Hey: Turn On TV to Channel 5". The smart transceiver 200A takes a snapshot of the surrounding spatial environment. The smart transceiver 200A compares the acoustic signal corresponding to Dad's instructions to its corresponding acoustic identification record in the identification table 409. If there is a match, a new rule record is generated and entered into Dad's composite training table 400. The rule includes: the composite spatial map, the targeted device, e.g. the living room TV 128, and the actions to perform on the targeted device, e.g. Turn the TV On and select channel 5. Next, the rule is executed by the smart transceiver 200A turning on the TV and setting the channel to Channel 5, via either a wired or wireless connection to a wireless smart TV, or via an indirect connection via the manufacturers' or vendors' cloud intermediary.

TRAINING: d) Dad@Bedroom entry: As Dad enters the bedroom, a.k.a. location "d", later that night at he issues the training instructions: "Hey: Turn ON Bedroom Lights" and "Hey: Turn Off Living Room TV" and "Hey: Turn Off Living Room Lights". The smart transceiver 200A takes a snapshot of the surrounding spatial environment. The smart transceiver 200A identifies Dad's voice and generates the new rules into Dad's composite training table 400. The rules include: the composite spatial map, the targeted devices, e.g. the living room TV 128 and lights and the bedroom TV 130, and the actions to perform on the targeted devices. Next, the rules are executed by the smart transceiver 200A by turning on the Bedroom lights, and turning off the Living Room TV and lights.

TRAINING: f) Dad@Bedroom Bed: As Dad reclines on the bed, a.k.a. location "f", later that night at he issues at 10 pm the following training instructions: "Hey: Turn ON Bedroom TV Channel 2" and "Hey: Turn Bedroom TV Off 11 pm" and "Hey: Turn Bedroom Lights Off 12 pm". The smart transceiver 200A takes a snapshot of the surrounding spatial environment. The smart transceiver 200A identifies Dad's voice and generates the new rules 400E$_{1-3}$ into Dad's composite training table 400 including the time at which to execute the rules. Next, the rules are executed by the smart transceiver 200A immediately in the case of tuning the TV to channel 2 and at the scheduled times of 11 pm and 12 pm in the case of respectively turning the TV off, and turning the lights off.

TRAINING: g) Dad@Front Door Exit: As Dad exits the home the next morning, a.k.a. location "a", he issues training instructions: "Hey: Lights Off", and "Hey: Temperature Lower", and "Hey: Security On". The smart transceiver 200A takes a snapshot of the surrounding spatial environment, in the form of a composite spatial map, both acoustic and WiFi of the entire structure inside and out. The composite spatial map includes the location, path/trajectory and identify of any occupants in the house. Dad's instructions are authenticated against the corresponding acoustic identification record in the identification table 409. The new rules are generated and entered into Dad's composite training table 400. The rules include: the composite spatial map, the targeted device, e.g. a wireless smart locks, smart thermostat and smart lights, and the action to perform on each targeted device, e.g. lock the door and activate security. In this case the composite spatial map includes indicia of the path of the trainer, e.g. Dad Exiting the home. Next, the rule is executed by the smart transceiver 200A locking the home, turning off the lights, and turning down the temperature via either a wired or wireless connection to a wireless smart devices or via an indirect connection via the smart devices' cloud intermediary.

FIGS. 4B-C show the automatic execution of the trained behavior in a spatial context in which the house is occupied. Once the composite spatial diagnostic system provided by the smart transceiver 200A is trained, subsequent behaviors are much less cumbersome because they no longer require human commands. As Dad 126 arrives home the next evening his presence at the front door is detected. After matching his voice print with the corresponding record in the identification table 409 the smart transceiver unlocks the door. Subsequent behaviors of the house are executed automatically by the smart transceiver 200A as it detects Dad's movement about the home using a combination of WiFi and audio spatial diagnostics and correlates that movement with prior training records in the composite training table 400.

The smart transceiver may be trained by each family member to their desired behaviors. Where the training of one family member conflicts with that provided by another family member, the smart transceiver will emit an audible query to the occupants, asking them which of the conflicting behaviors indicated by the composite training table should be executed. Thus, if Dad and Sys are both in the living room chairs at location "c" and each has trained the system with different TV channel selections, the smart transceiver will ask them to decide which of the two trained channel selections they want to view and respond to their instruction.

In an embodiment of the invention where the smart transceiver 200A accepts feedback from various smart: switches, lights, TVs, thermostats, appliances in the home, even the requirement for a family member(s) to train the smart transceiver as shown in FIG. 4A may be largely avoided. In this embodiment of the invention the smart transceiver automatically generates rules for the composite training table 400 based on feedback from these devices as to Dad's use thereof, together with the composite spatial maps sampled at the time of Dad's interaction with these devices. For example, when Dad has arrived home, after a day at work, and enters the living room the smart transceiver notes his identity, location and time and also his interactions with the smart light switch and smart thermostat on the living room wall. These smart devices relay their changed states, e.g. "On/Off" and temperature setting for example, to the smart transceiver 200A via a wired or wireless connection. The smart transceiver generates the corresponding rule(s) automatically. Thus, avoiding the need for Dad to verbally train the smart transceiver, and assuring the execution of these actions automatically the next day when Dad arrives home and enters the living room.

The smart transceiver's capability to observe and learn from spatial context as determined from the composite acoustic and WiFi samples, has a number of advantages over prior art smart speakers, specifically reduction in false positives, two factor authentication, improved aiming and calibration of the spatial diagnostic processing associated with one or the other of the acoustic and WiFi samples, and avoidance of the endless daily repetition by the user of what are basically repetitive workflows the need for which can be anticipated via composite spatial context based learning in accordance with an embodiment of the current invention.

FIGS. 4D-E show the automatic execution of the trained behavior in a spatial context in which the house is unoccupied. When Dad left the house, in FIG. 4A he gave instructions to the smart transceiver to activate its security mode. In that mode, the entire house and immediate surrounding environment is monitored by the smart transceiver 200a via its WiFi antenna array 212A-F and microphone array 210A-F. The presence and identity of the cat 476 is detected by the smart transceiver in the processing of its successive composite spatial diagnostic maps. No alarm is sounded because the cat is the family pet, as indicated by its matching WiFi and acoustic identification record in identification table 409. When the robber 456 is detected approaching the house at location "a" via either or both the acoustic and WiFi spatial maps generated by the smart transceiver the smart transceiver categorizes that person as an intruder because there is no corresponding identification/authentication record in the identification table 409. The smart transceiver vocalizes an audible warning directing the robber to leave the property. As the robber makes unauthorized entry into the home, his presence in the living room at location "b" is detected and the smart transceiver issues another warning, that it has automatically called the police 466. In the security mode, the smart transceiver may also activate the lights in the residence and or turn on security cameras to assist the police in apprehending the robber.

FIGS. 5A-C are hardware block diagrams of various devices configured to execute the composite spatial diagnostics of the trainable smart transceiver in accordance with an embodiment of the invention. FIG. 5A shows a detailed hardware block diagram of a trainable smart transceiver 200A operative as either a WAP or a station and incorporating the VLSI processor and program code shown in FIG. 5B. FIG. 5B is a detailed hardware block diagram of a Very Large Scale Integrated (VLSI) Circuit processor 500 coupled to non-volatile memory 510 containing program code for composite spatial diagnostics in accordance with an embodiment of the invention. FIG. 5C shows a smart home management server provided by a 'cloud' vendor communicatively coupled in an embodiment of the invention to the trainable smart transceiver and incorporating the VLSI processor and at least a portion of the executable program code functionality shown in FIG. 5B. In an embodiment of the invention the smart transceiver 200A provides the composite spatial diagnostics on its own. In another embodiment of the invention the smart transceiver is also communicatively coupled, via the shared broadband connection, to the remote smart home management server 254 provided by the vendor, e.g. corporation, ISP or Telco, which handles portions of the smart home management features and functions.

FIG. 5A shows a detailed hardware block diagram of a trainable smart transceiver 200A operative as either a WAP or a station and incorporating the VLSI processor and program code shown in FIG. 5B. The smart transceiver in this embodiment of the invention is identified as a 6×6 multiple-input multiple-output (MIMO) WAP supporting as many as 6 discrete communication streams over six antennas 359A-B. The smart transceiver 200A couples via an integral modem 522 to one of a cable, fiber or digital subscriber backbone connection to the Internet 152. In an embodiment of the invention the smart transceiver includes a network interface 521 for communicating with the remote server to offload portions of any one or all of the smart home management functions to the remote server, e.g. the smart home management server 254 shown in FIG. 5C. A packet bus 520 couples the modem to the MIMO WiFi stage 208. The WiFi stage supports wireless communications, e.g. IEEE 802.11 compliant communications, on a Wireless Local Area Network (WLAN) 557. The WiFi stage includes a baseband stage 530, and the analog front end (AFE) and Radio Frequency (RF) stages 548. In the baseband portion 530 wireless communications transmitted to or received from each user/client/station are processed. The AFE and RF portion 548 handles the upconversion on each of transmit paths of wireless transmissions initiated in the baseband. The RF portion also handles the downconversion of the signals received on the receive paths and passes them for further processing to the baseband.

TRANSMISSION: The transmit path/chain includes the following discrete and shared components. The WiFi medium access control (WMAC) component 532 includes: hardware queues 532A for each downlink and uplink communication stream; encryption and decryption circuits 532B for encrypting and decrypting the downlink and uplink communication streams; medium access circuit 532C for making the clear channel assessment (CCA), and making exponential random backoff and re-transmission decisions; and a packet processor circuit 532D for packet processing of the transmitted and received communication streams. The WMAC component has access to a node table 532E which lists each node/station on the WLAN, the station's capabilities, the corresponding encryption key, and the priority associated with its communication traffic.

Each sounding or data packet for wireless transmission on the transmit path components to one or more stations is framed in the framer 534. Next each stream is encoded and scrambled in the encoder and scrambler 536 followed by demultiplexing in demultiplexer 538 into separate streams. Next streams are subject to interleaving and mapping in a corresponding one of the interleaver mappers 540. Next all transmissions are spatially mapped with a spatial mapping matrix (SMM) 544 in the spatial mapper 542. The spatially mapped streams from the spatial mapper are input to Inverse Discrete Fourier Transform (IDFT) components 546 for conversion from the frequency to the time domain and subsequent transmission in the AFT and RF stage 548.

Each IDFT 546 is coupled to a corresponding one of the transmit path/chain components in the AFT RF stage 548 for wireless transmission on an associated one of MIMO antenna 212A-F. Specifically each IDFT couples to an associated one of the digital-to-analog converters (DAC) 550 for converting the digital transmission to analog, filters 552, upconverters 554, coupled to a common voltage controlled oscillator (VCO) 552 for upconverting the transmission to the appropriate center frequency of the selected channel(s), and power amplifiers 556 for setting the transmit power level of the transmission on the MIMO antenna array 212A-F.

RECEPTION: The receive path/chain includes the following discrete and shared components. Received communications on the WAP's array of MIMO antenna 212A-F are subject to RF processing including downconversion in the AFE-RF stage 548. There are six receive paths each including the following discrete and shared components: low noise amplifiers (LNA) 560 for amplifying the received signal under control of an analog gain control (AGC) (not shown) for setting the amount by which the received signal is amplified, downconverters 562 coupled to the VCO 552 for downconverting the received signals, filters 564 for bandpass filtering the received signals, analog-to-digital converters (ADC) 566 for digitizing the downconverted signals. In an embodiment of the invention an optional sampler 568 at the output of the ADCs 566 allows sampling of the received WiFi signals in the time domain, for subsequent WiFi spatial diagnostics by the processor 500 and non-volatile memory 510. The digital output from each ADC is passed to a corresponding one of the discrete Fourier transform (DFT) components 570 in the baseband portion 530 of the WiFi stage for conversion from the time to the frequency domain.

Receive processing in the baseband stage includes the following shared and discrete components including: an equalizer 572 to mitigate channel impairments which is coupled to the output of the DFTs 570. In an embodiment of the invention the received WiFi signals in the frequency domain from the output of the DFTs 570 either with or without equalization are provided to the processor 500 and non-volatile memory 510 for spatial diagnostics. The received WiFi streams at the output of the equalizer are subject to demapping and deinterleaving in a corresponding number of the demappers 574 and deinterleavers 576. Next the received stream(s) are multiplexed in multiplexer 578 and decoded and descrambled in the decoder and descrambler component 580, followed by de-framing in the deframer 582. The received communication is then passed to the WMAC component 532 where it is decrypted with the decryption circuit 532B and placed in the appropriate upstream hardware queue 532D for upload to the Internet 152.

The trainable smart transceiver also includes an array of microphones 210A-F and a speaker 202. Acoustic signals received by each microphone of the array of microphones are sampled in sampler 524. The acoustic samples are subject to either or both local spatial diagnostic processing by the processor 500 and non-volatile memory 510 or remote spatial diagnostic processing on the smart home management server 254 shown in FIG. 5C. Where a portion of the acoustic processing is handled on the smart home server 254 an optional audio codec 528 may be used to encode the samples for transport to the server.

In an embodiment of the invention the trainable smart transceiver may also include a Bluetooth stage (not shown) for communicating with Bluetooth enabled devices.

FIG. 5B is a detailed hardware block diagram of the VLSI circuit processor 500 coupled to non-volatile memory 510 containing program code for composite spatial diagnostics in accordance with an embodiment of the invention. The smart home management circuit 502A of the processor 500 couples to the aforesaid plurality of components which make up the transmit and receive paths of the WiFi stage 208 shown in FIG. 5A as well as to the microphone 202 and the acoustic sampler 524. The smart home management circuit 502A includes: a training circuit 506, a composite spatial diagnostic circuit 504 and a rule execution circuit 508. The composite spatial diagnostic circuit couples to non-volatile memory or storage 510. The non-volatile storage contains the program code 510C the execution of which by the composite diagnostic circuit in an embodiment of the invention enables all or part of the training, spatial diagnostic and rule execution functions performed by said circuit. The memory 510 also contains the training table 510A, and the identification table 510B.

The composite spatial diagnostic circuit 504 of the smart home management circuit couples to array of antennas 212A-F via the plurality of components which make up the WiFi stage 208 and to the array of microphones 210A-F to successively sample respectively a WiFi environment and an acoustic environment surrounding the wireless trainable smart transceiver 200A and to determine from each set of WiFi and acoustic samples a composite spatial map of humans and wireless transceivers within the surrounding environment. The composite spatial diagnostic circuit includes: an acoustic spatial diagnostic circuit 504A, a WiFi spatial diagnostic circuit 504B, an acoustic identification circuit 504C, a WiFi identification circuit 504D, and a spatial correlation circuit 504E.

The acoustic spatial diagnostic circuit 504A determines locations of sound sources in the surrounding environment from the acoustic samples provided by the acoustic sampler 524 shown in FIG. 5A. In an embodiment of the invention the acoustic spatial diagnostic circuit determines locations of sound sources by correlating a known geometry of the array of microphones 210A-F with the amplitude, time, phase, or angle of arrival of the acoustic samples of sounds emanating from humans, animals, and objects in the surrounding environment.

The WiFi spatial diagnostic circuit 504B determines locations of WiFi signal sources or interferers in the surrounding environment from the WiFi samples from the time or frequency domain portions of the WiFi Stage 208. In an embodiment of the invention the WiFi spatial diagnostic circuit determines locations of WiFi signal sources or interferers by correlating a known geometry of the array of antenna 210A-F with the amplitude, time, phase, or angle of arrival of the WiFi signal samples from WiFi transceivers or with the equalization or beamsteering matrices associated with those samples.

The acoustic identification circuit 504C identifies sound sources by correlating the acoustic samples provided by the sampler 524 with the authentication/identification records in the identification table 510B. These identification records contain acoustic profiles of specific humans, animals, and objects.

The WiFi identification circuit 504D identifies humans, animals and objects by correlating the WiFi samples with identification/authentication records in the identification table 510B, which records contain WiFi multi-path signal profiles for specific humans, animals, and objects.

The spatial correlation circuit also couples to both the acoustic spatial diagnostic circuit 504A and WiFi spatial diagnostic circuit 504B to correlate the acoustic and WiFi locations of animate and inanimate objects provided thereby with one another. The spatial correlation circuit 504E couples to both the acoustic identification circuit 504C and WiFi identification circuit 504D to correlate the acoustic and WiFi identifications of animate and inanimate objects provided thereby with one another. The spatial correlation circuit generates a succession of composite spatial maps containing the location and identity of animate and inanimate objects in the surrounding environment. In an embodiment of the invention each composite spatial map includes: a location and identity of humans and a location of wireless transceivers within a surrounding structure. In another embodiment of the invention the spatial correlation circuit 504E maintains a rolling history of the composite spatial maps, and determines therefrom the paths or fixed positions of each animate and inanimate object. In an embodiment of the invention the spatial correlation circuit 504E also recalibrates a location determination by a one of the acoustic and WiFi spatial diagnostic circuits based on a location determination made by another of the spatial diagnostic circuits. Recalibration may take place frequently or infrequently. Recalibration in one embodiment of the invention involves giving the location determination of one of the arrays, e.g. the acoustic array, greater weight than the location determination of the other of the arrays, e.g. the WiFi array, and vice-versa. These differences in recalibration weights may be based on differences in array size or quality of hardware, e.g. microphones or antenna, that make up each array. Difference in recalibration weights may also arise dynamically, based in differences in signal-to-noise ratio (SRN) between the signals sampled on the WiFi antenna array and the acoustic microphone array.

The training circuit 506 portion of the smart home management circuit includes: a word recognition circuit 506A, a voice identification circuit 506B, a target identification circuit 506C, and a rule generator circuit 506D. The training circuit recognizes spoken commands from a user and generates a corresponding rule which combines a recognized command with a current spatial context map output by the composite spatial diagnostic circuit. In an embodiment of the invention each rule combines an action to perform, and a context in which to perform the action, wherein the context includes a current spatial context map output by the composite spatial diagnostic circuit and a time of day. The word recognition circuit 506A recognizes the words spoken by the trainer and the corresponding instructions using simple word recognition or natural language processing (NLP). The voice identification circuit 506B identifies the user giving the training instructions based on a pattern match with their voice profile in a corresponding record of the identification table 5106. The target identifier circuit 506C identifies the target if any of the instructions given by the trainer(s), e.g. the smart light switch, or the TV. This identification may be based on a word or phrase in the instruction which identifies a device on which to perform an action, or based on proximity to the device as determined from a current composite spatial map generated by the composite spatial diagnostic circuit. The rule generator circuit 506D generates rules from the training instructions which rules are stored in the training table 510A. In an embodiment of the invention each rule combines an action to perform, and a context in which to perform the action, wherein the context includes a current spatial context map output by the composite spatial diagnostic circuit and a time of day. Some rules include a target device in the home on which to perform the proscribed action, e.g. turning on a smart light switch. Other rules have as a target the smart transceiver itself, e.g. a rule to wake Dad up at 6 am. Other rules have as a target the smart home management server 254 and the order entry capabilities it may support, e.g. rules related to order entry of goods or services.

In an embodiment of the invention where the rule generator circuit accepts wireless/wired feedback from smart devices in the home as to their current status, some rules may be generated automatically, without audible training instructions from the trainer. Each rule includes the current spatial context map which identifies the location and identity of the trainer and the targeted device the feedback from which identifies the action the trainer performed and the time at which he/she performed it. "Dad" manually turning on the smart light switch in the living room On/Off is turned into a corresponding rule. "Mom" manually Opening/Closing the front door smart lock, or manually raising or lowering the temperature setpoint on the household smart thermostat is turned into a corresponding rule by the rule generator circuit.

The rule execution circuit 508 couples to the composite spatial diagnostic circuit to execute an action proscribed by a selected rule when a related portion of the composite spatial map sampled by the composite spatial diagnostic circuit exhibits a correlation above a threshold amount with a spatial context condition associated with the selected rule. The rule correlation circuit 508B couples to the memory 510 to determine when a current spatial context map from the composite spatial diagnostic circuit substantially matches the spatial context of one of the rules stored in the training table 510A. For example, if the current composite spatial diagnostic map shows Dad on a path entering the living room, the rule correlation circuit searches among all the rules in memory to see which if any have a spatial context, e.g. composite spatial map, that is highly correlated with the current spatial context. In the event of an affirmative determination by the rule correlation circuit 508B, the rule execution circuit 508A executes the action proscribed by the selected one of the rules.

As the number of occupants in the home increases, so to does the possibility for conflict among rules, when more than one rule matches the current composite spatial map of the home or business. When the rule correlation circuit determines that more than one rule in the training table 510A matches the current spatial context, and further that the rules are in conflict, then the rule correlation circuit resolves the conflict by audibly, via the speaker 202, requesting updated instructions to resolve the conflict. For example, if Dad and Mom have different TV channel preferences in the home, and if both are in the living room, the smart transceiver resolves the conflict by asking them "Do you want channel 2, or channel 7?" and then executing the corresponding rule in response to their instructions. This resolution may be noted and may itself result in the generation of a corresponding new rule, covering the multiple occupant spatial context from which this 'conflict' arose.

As shown in FIG. 5C, in an embodiment of the invention the smart transceiver 200A is coupled to the remote computational device or 'cloud', e.g. smart home management server 254. The smart home management server 254 includes: the processor 500 and non-volatile storage 510; a bus 588; an input/output (I/O) module 590 for interfacing with an administrative user; a network module 592 for coupling to a network, e.g. the Internet; a main memory 594 for storing and executing at least a portion of program code 510C and corresponding data; and a read only memory (ROM) 596 for storing bootup program code. The processor 500 in addition to supporting the server functionality also may execute at least a portion of the program code which supports the smart home management functions as discussed above. In an embodiment of the invention the trainable smart transceiver 200A relays all acoustic or WiFi samples to the smart home management server 254 for spatial diagnostics, acoustic and or WiFi map generation and composite WiFi and Acoustic map generation. In another embodiment of the invention the smart home management server 254 handles at least one of the NLP or word recognition or voice identification functionality associated with training or spatial diagnostics. In another embodiment of the invention all smart home management functionality resides on the trainable smart transceiver itself. In still another embodiment of the invention the smart home management functions of training, spatial diagnostics, and rule execution are performed collaboratively by both the smart transceiver 200A and the smart home management server 254 without departing from the scope of the claimed invention. In still another embodiment of the invention the smart home management circuit 502A of the smart WiFi transceiver 200A, lacks the WiFi spatial diagnostic capability and any dedicated circuits or processes required for same, relying instead exclusively on acoustic sampling for the acoustic spatial diagnostics and resulting acoustic spatial maps, as well as for training, and rule execution functions.

FIGS. 5D-F show this 'acoustic only' spatial diagnostic embodiment of the invention. FIGS. 5D-F are hardware block diagrams of various devices configured to execute acoustic spatial diagnostics of the trainable smart transceiver in accordance with the acoustic only embodiment of the invention. The acoustic spatial diagnostic embodiment of the invention shown in FIGS. 5D-F is distinguishable from the composite spatial diagnostic embodiment of the invention shown in FIGS. 5A-C primarily in terms of the circuits which it lacks. The remaining circuits perform similar functions to those discussed above in connection with FIGS. 5A-C and thus have the same reference numbers. In the acoustic spatial diagnostic embodiment of the invention the WAP's spatial diagnostic capabilities are limited to generating the acoustic spatial map 310 (see FIG. 3), and not the composite spatial map 340 (see FIG. 3). In other words, in this embodiment of the invention the WAP does not have the wireless spatial diagnostic capabilities shown on the bottom half of FIG. 3.

FIG. 5D shows a detailed hardware block diagram of a trainable smart transceiver 200B operative as either a WAP or a station and incorporating the VLSI processor and program code shown in FIG. 5E. The most noticeable changes between the composite and acoustic spatial diagnostics hardware shown in respectively FIGS. 5A and 5D are that the connections between the WiFi stage and the Smart home management circuit 502B provided by the equalizer or sampler have been removed, indeed the sampler itself is not required in the acoustic spatial diagnostic embodiment of the invention. Additionally, the WiFi stage is devoted exclusively to communications, rather than spatial diagnostics, and thus may comprise a single transmit and receive chain coupled to a single antenna as shown in FIG. 5D, or a MIMO array of antennas and associated transmit and receive chains dedicated to wireless communications, without departing from the scope of the claimed invention.

FIG. 5D shows a detailed hardware block diagram of a trainable smart transceiver 200B operative as either a WAP or a station and incorporating the VLSI processor and program code shown in FIG. 5E. The smart transceiver in this embodiment of the invention is identified as a 1×1 WAP supporting a single communication stream over antenna 213. The smart transceiver 200B has an modem 522 providing a connection to the Internet 152. In an embodiment of the invention the smart transceiver has a network interface 521 for communicating with the remote server to offload portions of any one or all of the smart home management functions to the smart home management server 254 shown in FIG. 5F. The packet bus 520 couples the modem to the WiFi stage 208. The WiFi stage includes the baseband 530, and AFE and RF stages 548.

TRANSMISSION: The transmit path/chain includes the following discrete and shared components. The WMAC component 532 includes the sub-components discussed above in connection with FIG. 5A. Each sounding or data packet for wireless transmission is framed in the framer 534 and encoded and scrambled in the encoder and scrambler 536. Next the single transmit communication stream is interleaved and mapped in the interleaver and mapper 540 and input to the IDFT component 546 for conversion from the frequency to the time domain. The output of the IDFT is passed to the DAC 550, filter 552 and then to upconverter 554, coupled to VCO 552 for upconversion. After upconversion, the communication is amplified by power amplifier 556 for transmission on antenna 213.

RECEPTION: Received communications on the WAP's antenna 213F are subject to RF processing including downconversion in the AFE-RF stage 548. LNA 560 amplifies the received signal under control of an AGC. Downconverter 562 couples to the VCO 552 for downconverting the received signals. The received signal is filtered in filter 564 and passed to the ADC 566. The digital output from the ADC is passed to the DFT 570 in the baseband portion 530 of the WiFi stage for conversion from the time to the frequency domain. The output of the DFT is passed to equalizer 572 to mitigate channel impairments. The received WiFi stream is passed to demapper 574 and deinterleaver 576 and then decoded and descrambled by the decoder and descrambler component 580, followed by de-framing in the deframer 582. The received communication is then passed to the WMAC component 532 for upload to the Internet 152.

The trainable smart transceiver also includes the array of microphones 210A-F and a speaker 202. The microphones may be sensitive over a broad range of frequencies, from 1 Hz to 10 MHz for example Acoustic signals received by each microphone of the array of microphones are sampled in sampler 524. The acoustic samples are subject to either or both local spatial diagnostic processing by the processor 500 and non-volatile memory 510 or remote spatial diagnostic processing on the smart home management server 254 shown in FIG. 5F. Where a portion of the acoustic processing is handled on the smart home server 254 the optional audio codec 528 may be used to encode the samples for transport to the server. In an embodiment of the invention the trainable smart transceiver may also include a Bluetooth stage (not shown) for communicating with Bluetooth enabled devices.

FIG. 5E is a detailed hardware block diagram of the VLSI Circuit processor 500 coupled to non-volatile memory 510 containing program code 510D for acoustic spatial diagnostics in accordance with an embodiment of the invention. The smart home management circuit 502B of the processor 500 couples to the speaker 202 and via the acoustic sampler 524 to the array of microphones 210A-F. The smart home management circuit 502A includes: the training circuit 506, an acoustic spatial diagnostic circuit 505 and the rule execution circuit 508. The smart home management circuit couples to non-volatile memory or storage 510. The non-volatile storage contains the program code 510D the execution of which by the smart home management circuit enables all or part of the training, spatial diagnostic and rule execution functions performed by said circuit. The memory 510 also contains the training table 510A, and the identification table 510B.

The acoustic spatial diagnostic circuit 505 of the smart home management circuit couples to the array of microphones 210A-F to successively sample the acoustic environment surrounding the wireless trainable smart transceiver 200B and to determine from each set of acoustic samples an acoustic spatial map of animate objects, e.g. humans and animals; and inanimate objects, e.g. appliances, utilities, and wireless transceivers within the surrounding environment. In this acoustic only embodiment of the invention, the acoustic spatial diagnostic circuit 505 is reduced in complexity compared to its composite counterpart, since it no longer has the WiFi SD circuit nor the WiFi ID circuit nor any connection to or input from the Wireless receive chain(s) or path(s). The acoustic spatial diagnostic circuit 505 includes: the acoustic spatial diagnostic sub-circuit 504A, the acoustic identification circuit 504C, and a spatial correlation circuit 504F.

The acoustic spatial diagnostic sub-circuit 504A determines locations of sound sources in the surrounding environment from the acoustic samples provided by the acoustic sampler 524 shown in FIG. 5D. In an embodiment of the invention the acoustic spatial diagnostic sub-circuit determines locations of sound sources by correlating a known geometry of the array of microphones 210A-F with the amplitude, time, phase, or angle of arrival of the acoustic samples of sounds emanating from humans, animals, and objects in the surrounding environment. The acoustic identification circuit 504C identifies sound sources by correlating the acoustic samples provided by the sampler 524 with the authentication/identification records in the identification table 510B. These identification records contain acoustic profiles of specific humans, animals, and objects. The spatial correlation circuit 504F couples to the acoustic identification circuit 504C to correlate the acoustic identifications of animate objects such as humans and animals and of inanimate objects and to generate a succession of acoustic spatial maps containing the location and identity of animate and inanimate objects in the surrounding environment. In another embodiment of the invention the spatial correlation circuit 504F maintains a rolling history of the acoustic spatial maps, and determines therefrom the paths or fixed positions of each animate and inanimate object.

The training circuit 506 portion of the smart home management circuit includes: the word recognition circuit 506A, the voice identification circuit 506B, the target identification circuit 506C, and the rule generator circuit 506D. The training circuit recognizes spoken commands from a user and generates a corresponding rule which combines a recognized command with a current acoustic spatial map output by the acoustic spatial diagnostic circuit. In an embodiment of the invention each rule combines an action to perform, and a context in which to perform the action, wherein the context includes a current spatial map output by the acoustic spatial diagnostic circuit and a time of day. The word recognition circuit 506A recognizes the words spoken by the trainer and the corresponding instructions using simple word recognition or NLP. The voice identification circuit 506B identifies the user giving the training instructions based on a pattern match with their voice profile in a corresponding record of the identification table 510B. The target identifier circuit 506C identifies the target if any of the instructions given by the trainer(s), e.g. the smart light switch, or the TV. This identification may be based on a word or phrase in the instruction which identifies a device on which to perform an action, or based on proximity to the device as determined from a current acoustic spatial map generated by the acoustic spatial diagnostic circuit. The rule generator circuit 506D generates rules from the training instructions which rules are stored in the training table 510A. In an embodiment of the invention each rule combines an action to perform, and a context in which to perform the action, wherein the context includes a current spatial map output by the acoustic spatial diagnostic circuit 505 and a time of day. Some rules include a target device in the home on which to perform the proscribed action, e.g. turning on a smart light switch. Other rules have as a target the smart transceiver itself, e.g. a rule to wake Dad up at 6 am. Other rules have as a target the smart home management server 254 and the order entry capabilities it may support, e.g. rules related to order entry of goods or services.

In an embodiment of the invention where the rule generator circuit accepts wireless/wired communications feedback from smart devices in the home as to their current status, some rules may be generated automatically, without audible training instructions from the trainer. Each rule includes the current spatial context map which identifies the location and identity of the trainer and the targeted device the feedback from which identifies the action the trainer performed and the time at which he/she performed it. "Dad" manually turning on the smart light switch in the living room On/Off is turned into a corresponding rule. "Mom" manually Opening/Closing the front door smart lock, or manually raising or lowering the temperature setpoint on the household smart thermostat is turned into a corresponding rule by the rule generator circuit.

The rule execution circuit 508 couples to the acoustic spatial diagnostic circuit 505 to execute an action proscribed by a selected rule when a related portion of the acoustic spatial map sampled by the acoustic spatial diagnostic circuit exhibits a correlation above a threshold amount with a spatial context condition associated with the selected rule. The rule correlation circuit 504B determines when a current acoustic spatial map from the acoustic spatial diagnostic circuit 505 substantially matches the spatial context of one of the rules, a.k.a. the selected rule, stored in the training table 510A. For example, if the current acoustic spatial diagnostic map shows Dad on a path entering the living room, the rule correlation circuit searches among all the rules in memory to see which if any have a spatial context, e.g. acoustic spatial map, that is highly correlated with the current spatial context. In the event of an affirmative determination by the rule correlation circuit 508B, the rule execution circuit 508A executes the action proscribed by the selected one of the rules.

As the number of occupants in the home increases, so to does the possibility for conflict among rules, when more than one rule matches the current acoustic spatial map of the home or business. When the rule correlation circuit determines that more than one rule in the training table 510A matches the current spatial context, and further that the rules are in conflict, then the rule correlation circuit resolves the conflict by audibly, via the speaker 202, requesting updated instructions to resolve the conflict. For example, if Dad and Mom have different TV channel preferences in the home, and if both are in the living room, the smart transceiver resolves the conflict by asking them "Do you want channel 2, or channel 7?" and then executing the corresponding rule in response to their instructions. This resolution may be noted and may itself result in the generation of a corresponding new rule, covering the multiple occupant spatial context from which this 'conflict' arose.

FIG. 5F shows the smart home management server provided by a 'cloud' vendor communicatively coupled in an embodiment of the invention to the trainable smart transceiver and incorporating the VLSI processor and at least a portion of the executable program code functionality shown in FIG. 5E. In an embodiment of the invention the smart transceiver 200B provides the acoustic spatial diagnostics on its own. In another embodiment of the invention the smart transceiver is also communicatively coupled, via the shared broadband connection, to the remote smart home management server 254 provided by the vendor, e.g. corporation, ISP or Telco, which handles portions of the smart home management features and functions.

FIG. 6A is a process flow diagram of processes or acts associated with operation of the trainable smart transceiver for smart home management.

After startup 600 control passes to the block of processes 610 associated with composite spatial diagnosis. The next set of acoustic samples received by the array of microphones on the smart transceiver in the home or business are obtained in process 612. Next in process 614 the relative or absolute location of animate objects in the home, e.g. humans and pets, and inanimate objects which have an acoustic signature, e.g. TV's and Appliances, is obtained from the acoustic samples and identified on an acoustic spatial map. In an embodiment of the invention the locations of the acoustic signal sources or interferers are determined by correlating a known geometry of the array of microphones 210A-F with any one or all of the amplitude, time, phase, or angle of arrival of the acoustic signal samples at each microphone of the array. The locations may be expressed in terms of azimuth and elevation of each acoustic signal source relative to the trainable smart transceiver's microphone array 210A-F as well as the distance of each sound source from the array. A host of more complex multi-source location determination algorithms such as "MUSIC" (Multi Signal Classification") and pseudo-Doppler direction finding can also be used for location determination. Next in process 616 each acoustic signal source, e.g. animate objects such as humans, pets, and inanimate objects such as dishwashers, located in the prior act, is identified, using for example pattern matching with known acoustic profiles in corresponding identification records of an identification table. Then control is passed to process 626.

The next set of WiFi samples are obtained in process 612, of the signals received by the array of antennas on the smart transceiver in the home or business. These samples may be obtained from normal WLAN communications or from dedicated probing of the WiFi spatial environment outside of normal WLAN communications. Next in process 622 the relative or absolute location of inanimate objects such as WiFi transceivers or animate objects such as humans and pets which interfere with WiFi communication links between the WiFi transceivers on the WLAN is obtained from the WiFi samples and identified on a WiFi spatial map. In an embodiment of the invention the locations of WiFi signal sources or interferers are determined by correlating a known geometry of the array of antenna 212A-F with any one or all of the amplitude, time, phase, or angle of arrival of the WiFi signal samples from WiFi transceivers or with the equalization or beamsteering matrices associated with those samples. The locations may be expressed in terms of azimuth and elevation of each WiFi signal source or interferer relative to the trainable smart transceiver's antenna array 212A-F as well as the distance of each from the antenna array. Additionally, in an embodiment of the invention the status of any wireless transceiver that provides feedback to the smart transceiver as to its status, e.g. On/Off in the case of a wireless smart switch, is obtained. In still another embodiment of the invention in which the smart transceiver includes another wireless stage, e.g. Bluetooth, Zigbee, etc. any location determination capabilities that stage enables may be used to further enhance the location determinations on the WiFi spatial map. Next in process 624 each WiFi signal source, e.g. WiFi transceiver, or interferer e.g. humans and pets located in the prior act, is identified, using for example pattern matching with known WiFi multipath signal profiles in corresponding identification records of an identification table. Then control is passed to process 626.

In process 626 the acoustic and WiFi spatial mappings are correlated to determine exact locations, and identities of the animate and inanimate objects in the environment surrounding the smart transceiver as well as any pairings between humans and wireless transceivers, e.g. Dad's Cellphone. Next control is passed to process 628 in which a composite spatial diagnostic map of the home including a day and timestamp is generated. Composite spatial diagnostic spatial map generation is an ongoing process with said maps generated in succession throughout the day.

In an embodiment of the invention the composite spatial diagnostics are generated collaboratively by the smart transceiver and the smart home management diagnostic server, with the smart transceiver sampling the acoustic and WiFi signals and the server processing the corresponding data and generating the composite spatial diagnostic maps. In another embodiment of the invention several smart transceivers in a home or business collaboratively perform the composite spatial diagnostics by sharing acoustic and WiFi signal samples or maps with one another, or with the remote server, e.g. the smart home management diagnostic server. The collaboration may follow either a master-slave or a peer-to-peer protocol. The smart transceiver's network interface 521 allows it to offload portions of any one or all of the smart home management functions to the remote server 254, e.g. uploading acoustic samples to the remote server for speech recognition training; or uploading acoustic and or WiFi samples to the remote server for generation of the acoustic or WiFi or composite spatial maps without departing from the scope of the claimed invention.

Next, control is passed to the block of processes 630 associated with training the smart transceiver. In process 632 word recognition is used to process voice training instructions from one of the trainers. In an alternate embodiment of the invention training instructions are non-verbal and arise from feedback of one or more of the smart home devices with which the user manually interacts. As each interaction takes place, the feedback, e.g. Light On/off, Door Open/Close is handled in the same manner as an instruction delivered vocally. Next in process 634 the trainer giving the instructions is identified using acoustic pattern matching of the received voice instructions to the voice prints/signatures of the various eligible trainers on file in an identification/authentication table. Next in process 636 a copy of the current composite spatial diagnostic map generated in process 628 is obtained. Control is then passed to process 638 in which a corresponding rule is generated including: the identity of the trainer, the action and targeted device or service for the action as indicated by their instructions, the time and day on which they gave the instruction, the current composite spatial diagnostic map, including their location when they delivered the instructions. Then in process 640 the rule is stored along with previously generated rules. Next, the action called for in the instructions is executed or scheduled for execution on the targeted device or service. Control is then passed to the block of processes 650 associated with rule execution.

In an embodiment of the invention the training instructions are processed collaboratively by the smart transceiver and the smart home management diagnostic server, with the smart transceiver sampling the acoustic and WiFi signals and the server handling the word and voice recognition and the generation and storage of the new rule(s).

Next, control is passed to the block of processes 650 associated with rule execution by the smart transceiver or by the smart transceiver collaboratively with the smart home management server. In process 652 the current composite spatial diagnostic map generated in process 628 is obtained. Next, any stored rules are identified for which the associated spatial context correlates above a threshold amount with the current composite spatial diagnostic map, e.g. time, day, and locations and identify of people in the home or business. Next, if a rule is found with the required correlation amount with the current spatial context as indicated by the current composite spatial diagnostic map, then that rule is executed, including the execution of the requested action on any targeted device or service. Control then returns to process block 610 for the generation of the next composite spatial diagnostic map of the home or business. In an embodiment of the invention each block of processes is executed asynchronously and in parallel.

FIG. 6B is a process flow diagram of processes associated with operation of the trainable smart transceiver with acoustic spatial diagnostic capability, for smart home management. In this 'acoustic only' embodiment of the invention the smart transceiver lacks WiFi spatial diagnostic capability and any of processes associated therewith. After startup 600 control passes to the block of processes 611 associated with acoustic spatial diagnosis. The next set of acoustic samples received by the array of microphones on the smart transceiver in the home or business are obtained in process 612. Next in process 614 the relative or absolute location of animate objects in the home, e.g. humans and pets, and inanimate objects which have an acoustic signature, e.g. TV's and Appliances, is obtained from the acoustic samples and identified on an acoustic spatial map. In an embodiment of the invention the locations of the acoustic signal sources or interferers are determined by correlating a known geometry of the array of microphones 210A-F with any one or all of the amplitude, time, phase, or angle of arrival of the acoustic signal samples at each microphone of the array. The locations may be expressed in terms of azimuth and elevation of each acoustic signal source relative to the trainable smart transceiver's microphone array 210A-F as well as the distance of each sound source from the array. A host of more complex multi-source location determination algorithms such as "MUSIC" (Multi Signal Classification") and pseudo-Doppler direction finding can also be used for location determination. Next in process 616 each acoustic signal source, e.g. animate objects such as humans, pets, and inanimate objects such as dishwashers, located in the prior act, is identified, using for example pattern matching with known acoustic profiles in corresponding identification records of an identification table. Then control is passed to process 627 in which the the acoustic spatial mappings are correlated to determine exact locations, and identities of the animate and inanimate objects in the environment surrounding the smart transceiver as well as any pairings between humans and wireless transceivers, e.g. Dad's Cellphone. Next control is passed to process 628 in which an acoustic spatial diagnostic map of the home including a day and timestamp is generated. Acoustic spatial diagnostic spatial map generation is an ongoing process with said maps generated in succession throughout the day.

In an embodiment of the invention the acoustic spatial diagnostics are generated collaboratively by the smart transceiver and the smart home management diagnostic server, with the smart transceiver sampling the acoustic signals and the server processing the corresponding data and generating the acoustic spatial diagnostic maps. In another embodiment of the invention several smart transceivers in a home or business collaboratively perform the acoustic spatial diagnostics by sharing acoustic samples or maps with one another, or with the remote server, e.g. the smart home management diagnostic server 254. The collaboration may follow either a master-slave or a peer-to-peer protocol. The smart transceiver's network interface 521 allows it to offload portions of any one or all of the smart home management functions to the remote server 254, e.g. uploading acoustic samples to the remote server for speech recognition training; or uploading acoustic samples to the remote server for generation of the acoustic spatial maps without departing from the scope of the claimed invention.

Next, control is passed to the block of processes 630 associated with training the smart transceiver. In process 632 word recognition is used to process voice training instructions from one of the trainers. In an alternate embodiment of the invention training instructions are non-verbal and arise from feedback of one or more of the smart home devices with which the user manually interacts. As each interaction takes place, the feedback, e.g. Light On/off, Door Open/Close is handled in the same manner as an instruction delivered vocally. Next in process 634 the trainer giving the instructions is identified using acoustic pattern matching of the received voice instructions to the voice prints/signatures of the various eligible trainers on file in an identification/authentication table. Next in process 636 a copy of the current acoustic spatial diagnostic map generated in process 628 is obtained. Control is then passed to process 638 in which a corresponding rule is generated including: the identity of the trainer, the action and targeted device or service for the action as indicated by their instructions, the time and day on which they gave the instruction, the current acoustic spatial diagnostic map, including their location when they delivered the instructions. Then in process 640 the rule is stored along with previously generated rules. Next, the action called for in the instructions is executed or scheduled for execution on the targeted device or service. Control is then passed to the block of processes 650 associated with rule execution.

In an embodiment of the invention the training instructions are processed collaboratively by the smart transceiver and the smart home management diagnostic server, with the smart transceiver sampling the acoustic signals and the server handling the word and voice recognition and the generation and storage of the new rule(s).

Next, control is passed to the block of processes 650 associated with rule execution by the smart transceiver or by the smart transceiver collaboratively with the smart home management server. In process 652 the current acoustic spatial diagnostic map generated in process 628 is obtained. Next, any stored rules are identified for which the associated spatial context correlates above a threshold amount with the current acoustic spatial diagnostic map, e.g. time, day, and locations and identify of people in the home or business. Next, if a rule is found with the required correlation amount with the current spatial context as indicated by the current acoustic spatial diagnostic map, then that rule is executed, including the execution of the requested action on any targeted device or service. Control then returns to process block 611 for the generation of the next acoustic spatial diagnostic map of the home or business. In an embodiment of the invention each block of processes is executed asynchronously and in parallel.

Example of Combined WiFi and Acoustic Spatial determinations: The integration of WiFi transceivers and acoustic sensors allows a range of voice control applications such as: activating smart home devices, user localization, and home surveillances. Voice controlled devices are susceptible to errors due to: ambient noise, interference from other people, and reverberations in the environment. The impact of these errors is especially noticeable if the user is not in the near field of the microphone array. To improve the reliability of speech recognition, Wi-Fi user presence detection and user motion detection can be used to improve the reliability of acoustic signal processing. The WiFi signal processing can be accomplished in either the baseband stage, i.e. frequency domain; or in the AFE/RF stage, i.e. time domain. In the following exposition a similar phased array processing technique is used for acoustic and WiFi signal processing, though this need not be the case. This example shows processing in the time domain and can be applied to both microphone arrays and antenna arrays. Later we present the same processing in the frequency domain which is easier to implement for OFDM based Wi-Fi systems. Regardless of the location determination technique, a benefit of combining the location and movement determinations from both WiFi and acoustic signals is an improved accuracy of location determinations.

Assume that there are total of K sources of interest for localization determination. One of these sources can be the user and the rest are the reflections from the environment. For simplicity, we assume both the microphone array and the antenna arrays both have the same number of elements and the same geometries. In this embodiment of the invention Direction of Arrival (DoA) is determined for the uniform circular array of antennas and microphones.

The beampattern of the uniform circular array (UCA) is periodic in azimuth. It can therefore be broken down into different Fourier harmonics by using the Fourier analysis. Each of these Fourier harmonics is termed a phase-mode of the circular array. For N-element omni directional UCA, each array element n, receives a signal from each one of the sources at certain direction. This direction is described by two angles: θ and ϕ that are the zenith and azimuth angles of the sources measured from the y and x axis, respectively. Taking the center of the UCA as reference, the phase shift experienced by the n-the element caused by the far field source is given by $$a_n(\Theta) = e^{jk_0 r \sin\theta \cos(\phi - \gamma_{n-1})}$$

where $n \in [1,N]$, $k_0 = 2\pi/\lambda$, $\gamma_n = 2\pi n/N$, and $\lambda$ is the wavelength of the radiated signal. The steering array vector can be written as $$a(\Theta) = [a_1(\Theta), a_2(\Theta), \ldots a_N(\Theta)]^T$$

where T denotes the vector transposition, r is the UCA radius, and $\Theta = (\theta, \phi)$.

The UCA can be excited with m-th phase-mode by using a m-th phase-mode beamforming vector, $W_m$ $$w_m = \frac{1}{N}[e^{-jm\gamma_0}, e^{-jm\gamma_1} \ldots \ldots, e^{-jm\gamma_{N-1}}]^T$$

The resulting m-th phase-mode array beampattern is $$f_m(\Theta) = w_m^H a(\Theta)$$

$$= \frac{1}{N}\sum_{n=0}^{N-1} e^{jm\gamma_n} e^{jk_0 r\sin\theta\cos(\phi-\gamma_n)}$$

where H denotes the Hermitian transpose operator.

Assuming total of K sources impinging on an N-element omni-directional UCA, the array response can be represented by $$x(t)=A\ s(t)$$

where $$A=[a(\Theta_1): a(\Theta_2): \ldots \ldots \ldots : a(\Theta_K)]$$

is the array response matrix, and $$s(t)=[s_1(t), s_2(t), \ldots \ldots \ldots , s_K(t)]^T$$

represents the K far field sources. For simplicity of the presentation, it is assumed that the sources are uncorrelated and they lie in the azimuth plane, which means $\theta=90°$, $\Theta=\phi$.

A number M snapshots of the array are collected within the coherence time of the channel and the data matrix is given by $$X=[x(t_1): x(t_2): \ldots \ldots \ldots : x(t_M)]$$

The expected covariance matrix, R, is thus defined as $$R = \frac{1}{M}X\ X^H$$

The DoA in accordance with this approach may be estimated by by scanning a beam throughout the azimuth. The DoAs are located by the peaks in the power azimuth spectrum, $P_{CBM}(\phi)$, which is given by $$P_{CBM}(\phi)=a^H(\phi)Ra(\phi)$$

To get better accuracy for the DoA, a multiple signal classification process such as "MUSIC" can be used. The MUSIC spectrum is given by $$P_{MUSIC}(\phi) = \frac{1}{a^H(\phi)ZZ^H a(\phi)}$$

where Z is the noise subspace of covariance matrix R as defined above. The DoAs are located by the peaks in the power azimuth spectrum, $P_{MUSIC}(\phi)$ as before. The Note that this processing is described in the time domain which is similar for audio and wireless array processing. However, when Wi-Fi systems are used, the same processing can be performed after the FFT operation in the frequency domain for easier implementation.

For the frequency domain, we simply replace the array output matrix X with the channel estimates or simplicity of the notation we assume that the STA has one antenna, whereas the AP has N receive antennas and M subcarriers used for training sequences. Then we can write frequency domain version of the array output matrix that consists of M snapshots as follows $$X = \begin{bmatrix} H_{1,1} & \cdots & H_{1,M} \\ \vdots & \ddots & \vdots \\ H_{N,1} & \cdots & H_{N,M} \end{bmatrix}$$

Note that the steering matrix do not change across closely spaced subcarriers. The sources can be envisioned as complex path coefficients for this array model in the frequency domain. The MUSIC processing steps defined above will provide the DoA of the sources in the environment. However, only one of these sources is the actual user. Other sources can be any objects that the radio signal reflects from and is received by the AP antennas. There are some unique characteristics of the user that can be analyzed for localization. For this, we use the following observations. At the output of the MUSIC algorithm, we have the K maximum peaks selected and their relative magnitudes. K less than 10 will typically suffice for spatial diagnostics within a home or business. We can use the maximum peak of the MUSIC spectrum as the direct path and use the corresponding DoA as the DoA of the user. The direct path has the minimum standard deviation in DoA, as calculated from different measurements. So, we can compare the variances of K sources and select the DoA of the minimum variance source as the DoA of the user. A more refined metric can be obtained by defining a likelihood function for the joint decision. For the following $P_{MUSIC}$ represents the magnitude of the K sources and $\sigma_\phi$ represents the standard deviation of the DoAs for the same sources. Then a function can be defined that represents the likelihood of a particular path belonging to the user as follows.

$$\text{likelihood}(k)=\exp(w_{MUSIC}P_k - w_\phi \sigma_{\phi_k})$$

where parameters $w_{MUSIC}$ and $w_\phi$ are the corresponding weights. For example, for a MUSIC algorithm where the magnitude of the peaks is hard limited to $P_{max}$, and the maximum $\sigma_\phi$ is hard limited to $\sigma_{max}$, we can simply select $w_{MUSIC}=1/P_{max}$, $w_\phi=1/\sigma_{max}$. The angle phi ($\phi$) is the azimuthal direction of the animate or inanimate object that has been located, on either of the arrays. In an embodiment of the invention this information received from the WiFi array may be used dynamically to temporarily steer the acoustic array in the direction of the trainer.

In an embodiment of the invention either the microphone or antenna arrays can be used to track users that are neither WiFi nor Acoustic signal sources using echo location. In this embodiment of the invention the smart transceiver emits/transmits either or both a sound for echo location by the microphone array or a WiFi signal for concurrent processing by the WiFi antenna array. In the WiFi case, this can be achieved by the smart transceiver periodically sounding itself from one of its antennas in transmission mode. At the same time, the AP sets the remaining of its antennas to receive mode. The MUSIC processing steps may be applied to the received signals. However, there is a major difference for the post processing of the MUSIC algorithm. In this case, we cannot assume that the direct path belongs to the user or the user has the minimum standard deviation of the DoA. Because the shortest path is the path from transmit antenna to receive antennas. However, we can still employ user tracking algorithms. When the user moves, its DoA will change accordingly and we can track the user's direction of movement with periodic measurements in time. Also, by observing the change of magnitude of the peaks in the MUSIC spectrum that belongs to the user, we can deduce whether the user coming closer towards the AP or moving away from the AP. As the user gets closer to the AP, the magnitude of the peak that corresponds to its DoA will increase.

The components and processes disclosed herein may be implemented in a combination of software, circuits, hardware, and firmware, coupled to the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method comprising:
   training a smart transceiver with spatial context conditions by sampling an acoustic environment via an array of microphones operatively coupled to the smart transceiver;
   generating an acoustic spatial map of activity within the acoustic environment based on sets of acoustic samples;
   analyzing the acoustic spatial map to identify a particular acoustic profile in the acoustic environment; and
   correlating the acoustic profile to a physical object to determine that the physical object is present in the acoustic environment.

2. The method of claim 1, further comprising identifying a location of the physical object in the acoustic environment based on the sets of acoustic samples.

3. The method of claim 2, wherein identifying the location of the physical object in the acoustic environment comprises correlating a known geometry of the array of microphones with at least one of: an amplitude, time, phase, or angle of arrival of the acoustic samples of sounds emanating from the physical object in the acoustic environment.

4. The method of claim 1, further comprising determining a movement of the physical object in the acoustic environment.

5. The method of claim 4, wherein determining the movement of the physical object in the acoustic environment comprises:
   generating a succession of acoustic spatial maps, each acoustic map of the succession of acoustic spatial maps including a respective location of the physical object in the acoustic environment;
   identifying a difference in the respective locations of the physical object in the acoustic environment;
   determining, based on the difference in the respective locations of the physical object in the acoustic environment, the movement of the physical object in the acoustic environment.

6. The method of claim 5 further comprising determining a path of the movement of the physical object in the acoustic environment.

7. The method of claim 6, wherein the path of the movement of the physical object in the acoustic environment is used to predict a future location of the physical object in the acoustic environment.

8. An apparatus, comprising:
   a plurality of components coupled to one another to form a transmit and receive path to process wireless communications;
   a microphone to receive a set of acoustic samples that relate to an acoustic environment;
   an acoustic spatial diagnostic circuit coupled to the microphone, the acoustic spatial diagnostic circuit to:
      determine, from the set of acoustic samples, an acoustic spatial map of the acoustic environment;
      analyze the acoustic spatial map to identify a particular acoustic profile in the acoustic environment; and
      correlate the acoustic profile to a physical object to determine that the physical object is present in the acoustic environment.

9. The apparatus of claim 8, the acoustic spatial diagnostic circuit further to identify a location of the physical object in the acoustic environment based on the sets of acoustic samples.

10. The apparatus of claim 9, wherein when identifying the location of the physical object in the acoustic environment, the acoustic spatial diagnostic circuit is to correlate a known geometry of an array of microphones with at least one of: an amplitude, time, phase, or angle of arrival of the set of acoustic samples emanating from the physical object in the acoustic environment.

11. The apparatus of claim 8, the acoustic spatial diagnostic circuit further to determine a movement of the physical object in the acoustic environment.

12. The apparatus of claim 11, wherein when determining the movement of the physical object in the acoustic environment, the acoustic spatial diagnostic circuit is to:
   generate a succession of acoustic spatial maps, each acoustic map of the succession of acoustic spatial maps including a respective location of the physical object in the acoustic environment;
   identify a difference in the respective locations of the physical object in the acoustic environment; and
   determine, based on the difference in the respective locations of the physical object in the acoustic environment, the movement of the physical object in the acoustic environment.

13. The apparatus of claim 12, the acoustic spatial diagnostic circuit further to determine a path of the movement of the physical object in the acoustic environment.

14. The apparatus of claim 13, wherein the path of the movement of the physical object in the acoustic environment is used to predict a future location of the physical object in the acoustic environment.

15. One or more non-transitory computer-readable media containing instructions that, in response to being executed by one or more processors, cause a system to perform operations comprising:
   generating an acoustic spatial map of activity within an acoustic environment based on sets of acoustic samples;
   analyzing the acoustic spatial map to identify a particular acoustic profile in the acoustic environment; and
   correlating the acoustic profile to a physical object to determine that the physical object is present in the acoustic environment.

16. The non-transitory computer-readable media of claim 15, the operations further comprising identifying a location of the physical object in the acoustic environment based on the sets of acoustic samples.

17. The non-transitory computer-readable media of claim 16, wherein identifying the location of the physical object in the acoustic environment comprises correlating a known geometry of an array of microphones with at least one of: an amplitude, time, phase, or angle of arrival of the acoustic samples of sounds emanating from the physical object in the acoustic environment.

18. The non-transitory computer-readable media of claim 15, the operations further comprising determining a movement of the physical object in the acoustic environment.

19. The non-transitory computer-readable media of claim 18, wherein determining the movement of the physical object in the acoustic environment comprises:
- generating a succession of acoustic spatial maps, each acoustic map of the succession of acoustic spatial maps including a respective location of the physical object in the acoustic environment;
- identifying a difference in the respective locations of the physical object in the acoustic environment; and
- determining, based on the difference in the respective locations of the physical object in the acoustic environment, the movement of the physical object in the acoustic environment.

20. The non-transitory computer-readable media of claim 19, the operations further comprising determining a path of the movement of the physical object in the acoustic environment.

* * * * *